United States Patent
Thors et al.

(10) Patent No.: US 7,509,828 B2
(45) Date of Patent: Mar. 31, 2009

(54) TOOL FOR MAKING ENHANCED HEAT TRANSFER SURFACES

(75) Inventors: Petur Thors, Decatur, AL (US); Nikolai Zoubkov, Moscow (RU)

(73) Assignee: Wolverine Tube, Inc., Huntsville, AL (US)

( * ) Notice: Subject to any disclaimer, the term of this patent is extended or adjusted under 35 U.S.C. 154(b) by 414 days.

(21) Appl. No.: 11/388,689

(22) Filed: Mar. 24, 2006

(65) Prior Publication Data

US 2006/0213346 A1    Sep. 28, 2006

Related U.S. Application Data

(60) Provisional application No. 60/665,528, filed on Mar. 25, 2005.

(51) Int. Cl.
*B21B 19/08* (2006.01)
(52) U.S. Cl. .................. 72/96; 72/102; 72/117; 72/123; 72/370.17; 408/147
(58) Field of Classification Search ............. 72/77, 72/96, 97, 102, 104, 117, 118, 119, 120, 72/123, 370.06, 370.07, 370.08, 370.17, 72/399; 409/73, 74, 78, 143, 213, 217, 260, 409/261; 408/147, 154, 158, 168; 165/179; 29/890.049, 890.053
See application file for complete search history.

(56) References Cited

U.S. PATENT DOCUMENTS

| | | | |
|---|---|---|---|
| 2,314,084 A | | 3/1943 | Fried |
| 2,352,912 A | * | 7/1944 | Parker .................. 29/243.518 |
| 3,077,916 A | * | 2/1963 | Vaughn ........................ 72/393 |
| 3,089,362 A | * | 5/1963 | Hill ............................. 72/120 |
| 3,202,212 A | | 8/1965 | Kritzer |
| 3,512,240 A | * | 5/1970 | Robinson ................... 29/566.1 |
| 3,753,364 A | | 8/1973 | Runyan et al. |

(Continued)

FOREIGN PATENT DOCUMENTS

EP    0865838 A    9/1998

(Continued)

OTHER PUBLICATIONS

Patent Abstracts of Japan, JP-02034237, Furukawa Electric Co Ltd, Published Feb. 5, 1990.

(Continued)

*Primary Examiner*—Edward Tolan
(74) *Attorney, Agent, or Firm*—Kilpatrick Stockton LLP; Kristin J. Doyle

(57) ABSTRACT

An improved tool assembly for enhancing the surface of a heat transfer tube is provided. The tool assembly includes rods having cutting tips and positioned in rod guides which are slidably positioned in shafts provided in a tool holder. In an equilibrium state, the cutting tips do not extend from the tool holder. When a force is applied to the rod guides, the rod guides move in a first direction along the shafts in the tool holder, resulting in exposure of the cutting tips which enhance the tube surface. When the force is removed from the rod guides, the rod guides move along the shafts in a direction opposite the first direction to retract the cutting tips within the tool holder. In this way, the cutting tips are protected when not in use.

22 Claims, 39 Drawing Sheets

U.S. PATENT DOCUMENTS

| | | | |
|---|---|---|---|
| 3,776,018 | A | 12/1973 | Frecnh |
| 3,847,212 | A | 11/1974 | Withers, Jr. et al. |
| 3,865,184 | A | 2/1975 | Grover |
| 3,886,639 | A | 6/1975 | Pasternak |
| 4,166,498 | A | 9/1979 | Nfujie et al. |
| 4,203,311 | A | 5/1980 | O'Connor et al. |
| 4,561,497 | A | 12/1985 | Nakajima et al. |
| 4,602,681 | A | 7/1986 | Daikoku et al. |
| 4,606,405 | A | 8/1986 | Nakayama et al. |
| 4,624,122 | A | 11/1986 | Bridier |
| 4,646,548 | A | 3/1987 | Zimmerli et al. |
| 4,653,163 | A | 3/1987 | Kuwahara et al. |
| 4,672,834 | A | 6/1987 | Alberto |
| 4,674,923 | A * | 6/1987 | Ogilvie et al. .......... 407/31 |
| 4,678,029 | A | 7/1987 | Sasaki et al. |
| 4,706,355 | A | 11/1987 | Kuhns et al. |
| 4,794,984 | A | 1/1989 | Lin |
| 4,819,525 | A | 4/1989 | Rabe |
| 4,831,702 | A * | 5/1989 | Vossbrinck et al. .... 29/890.031 |
| 4,938,282 | A | 7/1990 | Zohler |
| 5,052,476 | A | 10/1991 | Sukumoda et al. |
| 5,181,810 | A | 1/1993 | Heule |
| 5,332,034 | A | 7/1994 | Chiang et al. |
| 5,351,397 | A | 10/1994 | Angeli |
| 5,458,191 | A | 10/1995 | Chiang et al. |
| 5,555,622 | A | 9/1996 | Yamamoto et al. |
| 5,597,039 | A | 1/1997 | Rieger |
| 5,655,599 | A | 8/1997 | Kasprzyk |
| 5,669,441 | A | 9/1997 | Spencer |
| 5,682,946 | A | 11/1997 | Schmidt et al. |
| 5,690,167 | A | 11/1997 | Rieger |
| 5,692,560 | A | 12/1997 | Messant et al. |
| 5,697,430 | A | 12/1997 | Thors et al. |
| 5,704,424 | A | 1/1998 | Kohno et al. |
| 5,709,029 | A | 1/1998 | Innes |
| 5,755,538 | A | 5/1998 | Heule |
| 5,775,187 | A | 7/1998 | Nikolai et al. |
| 5,775,411 | A | 7/1998 | Schuez et al. |
| 5,782,121 | A | 7/1998 | Wetzels |
| 5,791,405 | A | 8/1998 | Takiura et al. |
| 5,803,164 | A | 9/1998 | Schuez et al. |
| 5,803,165 | A | 9/1998 | Shikazono et al. |
| 5,862,857 | A | 1/1999 | Ishikawa et al. |
| 5,915,467 | A | 6/1999 | Ishikawa et al. |
| 5,933,953 | A | 8/1999 | Spencer et al. |
| 5,934,128 | A | 8/1999 | Takiura et al. |
| 5,950,716 | A | 9/1999 | Applequist et al. |
| 5,950,718 | A | 9/1999 | Sugitani et al. |
| 5,975,196 | A | 11/1999 | Gaffaney et al. |
| 5,996,686 | A | 12/1999 | Thors et al. |
| 6,000,466 | A | 12/1999 | Aoyagi et al. |
| 6,016,678 | A * | 1/2000 | Diller .......... 72/119 |
| 6,018,963 | A | 2/2000 | Itoh et al. |
| 6,026,892 | A | 2/2000 | Kim et al. |
| 6,056,048 | A | 5/2000 | Takahashi et al. |
| 6,067,712 | A | 5/2000 | Randlett et al. |
| 6,164,370 | A | 12/2000 | Rbinson et al. |
| 6,167,950 | B1 | 1/2001 | Gupte et al. |
| 6,173,762 | B1 | 1/2001 | Ishida et al. |
| 6,173,763 | B1 | 1/2001 | Sano et al. |
| 6,176,301 | B1 | 1/2001 | Bennett et al. |
| 6,176,302 | B1 | 1/2001 | Takahashi et al. |
| 6,182,743 | B1 | 2/2001 | Bennett et al. |
| 6,298,909 | B1 | 10/2001 | Fukatami et al. |
| 6,336,501 | B1 | 1/2002 | Ishikawa et al. |
| 6,488,078 | B2 | 12/2002 | Beutler et al. |
| 6,766,817 | B2 | 7/2004 | da Silva |
| 6,913,074 | B2 | 7/2005 | Yamamoto et al. |
| 6,918,404 | B2 | 7/2005 | da Silva |

FOREIGN PATENT DOCUMENTS

| | | |
|---|---|---|
| EP | 0522985 B2 | 2/2000 |
| EP | 0845646 B1 | 9/2001 |
| FR | 2268580 A | 11/1975 |
| JP | 54068554 A | 6/1979 |
| JP | 56059194 | 5/1981 |
| JP | 62237295 A | 10/1987 |
| JP | 09108759 | 4/1997 |
| JP | 09141361 A | 6/1997 |
| JP | 09295037 | 11/1997 |
| JP | 10052714 | 2/1998 |
| JP | 10103886 | 4/1998 |
| JP | 10197184 A | 7/1998 |
| JP | 10206061 | 8/1998 |
| JP | 10281676 | 10/1998 |
| JP | 11226635 | 8/1999 |
| JP | 2000193345 | 7/2000 |

OTHER PUBLICATIONS

Patent Abstracts of Japan, JP-02108410, Furukawa Electric Co Ltd, Published Apr. 20, 1990.

Patent Abstracts of Japan, JP-02112822, Furukawa Electric Co Ltd, Published Apr. 25, 199.

Patent Abstracts of Japan, JP-02133798, Hitachi Cable Ltd, Published May 22, 1990.

Patent Abstracts of Japan, JP-03124337, Zexel Corp, Published May 27, 1991.

Patent Abstracts of Japan, JP-03268816, Matsushita Refrig Co Ltd, Published Nov. 29, 1991.

Patent Abstracts of Japan, JP-04009210, Matsushita Electric Ind Co Ltd, Published Jan. 14, 1992.

Patent Abstracts of Japan, JP-04091819, Mitsubishi Heavy Ltd, Published Mar. 25, 1992.

Patent Abstracts of Japan, JP-04151473, Hitachi Zosen Crop, Published May 25, 1992.

Patent Abstracts of Japan, JP-04266418, Sumitomo Light Metal Ind Ltd, Published Sep. 22, 1992.

Patent Abstracts of Japan, JP-04319019, Kobe Steel Ltd, Published Nov. 10, 1992.

Patent Abstracts of Japan, JP-04333339, Segawa Kihachiro, Published Nov. 20, 1992.

Patent Abstracts of Japan, JP-05106990, Mitsubishi Shindoh Co., Ltd, Published Apr. 27, 1993.

Patent Abstracts of Japan, JP-05231790 Kobe Steel ltd, Published Sep. 7, 1993.

Patent Abstracts of Japan, JP-08035739, Sumitomo Light Metal Ind Ltd, Published Feb. 6, 1996.

Patent Abstracts of Japan, JP-08313182, Matsushita Electric Ind Co Ltd, Published Nov. 29, 1996.

Patent Abstracts of Japan, JP-08099206, Showa Aluminum Corp., Published Apr. 16, 1996.

Patent Abstracts of Japan, JP-09113169, Matsushita Refrig Co Ltd, Published May 2, 1997.

Patent Abstracts of Japan, JP-09141361, Hitachi Cable Ltd, Published Jun. 3, 1997.

* cited by examiner

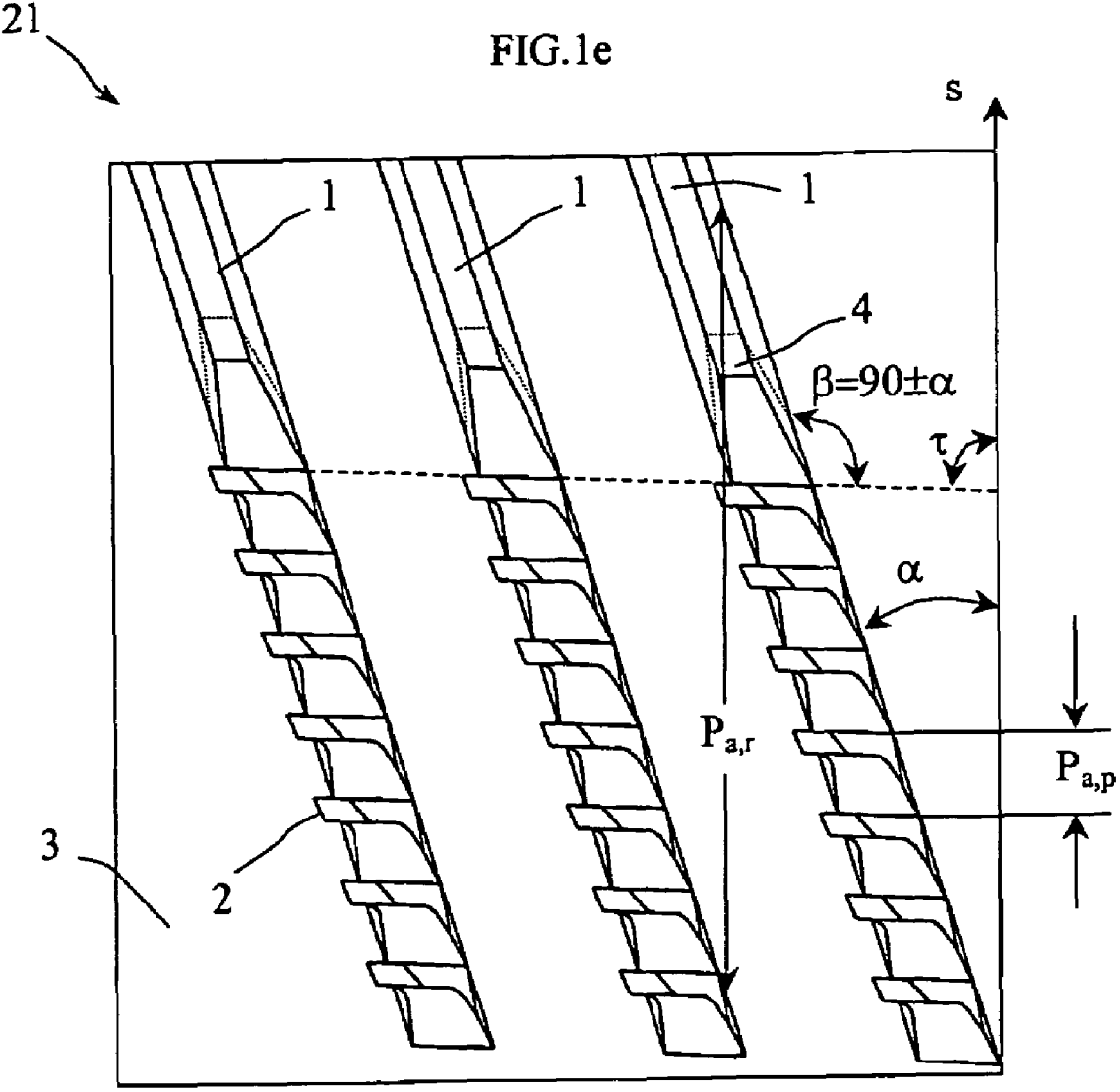

FIG.7a
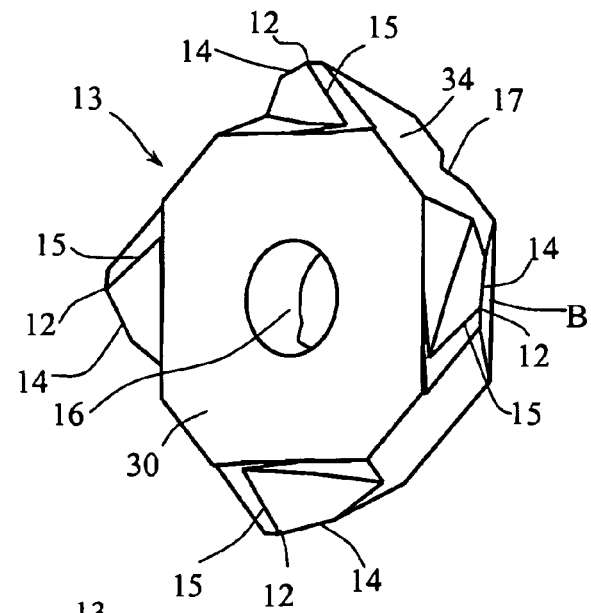
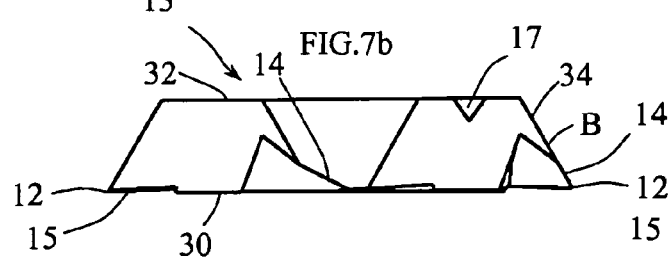
FIG.7b
FIG.7c
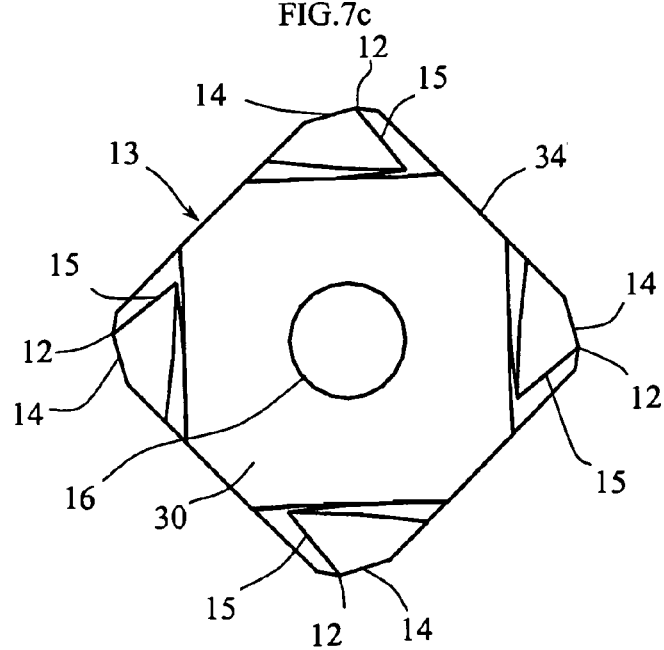
FIG.7d
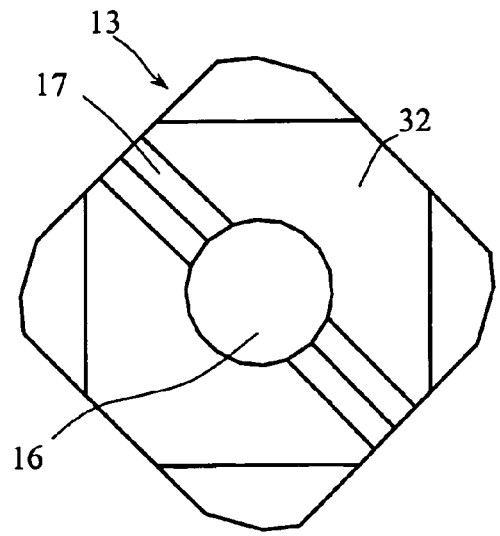

TOOL FOR MAKING ENHANCED HEAT TRANSFER SURFACES

CROSS-REFERENCE TO RELATED APPLICATIONS

This application claims the benefit of U.S. Application Ser. No. 60/665,528, filed on Mar. 25, 2005, the entirety of which is hereby incorporated by reference.

FIELD OF THE INVENTION

The invention relates generally to a tool and method for forming enhanced heat transfer surfaces.

BACKGROUND OF THE INVENTION

This invention relates to enhanced heat transfer surfaces, such as the surfaces (and particularly the inner surfaces) of heat transfer tubes, that facilitate heat transfer from one side of the surface to the other. Heat transfer tubes are commonly used in equipment, such as, for example, flooded evaporators, falling film evaporators, spray evaporators, absorption chillers, condensers, direct expansion coolers, and single phase coolers and heaters, used in the refrigeration, chemical, petrochemical, and food-processing industries. A variety of heat transfer mediums may be used in these applications, including, but not limited to, pure water, a water glycol mixture, any type of refrigerant (such as R-22, R-134a, R-123, etc.), ammonia, petrochemical fluids, and other mixtures.

An ideal heat transfer tube would allow heat to flow completely uninhibited from the interior of the tube to the exterior of the tube and vice versa. However, such free flow of heat across the tube is generally thwarted by the resistance to heat transfer. The overall resistance of the tube to heat transfer is calculated by adding the individual resistances from the outside to the inside of the tube or vice versa. To improve the heat transfer efficiency of the tube, tube manufacturers have striven to uncover ways to reduce the overall resistance of the tube. One such way is to enhance the outer surface of the tube, such as by forming fins on the outer surface. As a result of recent advances in enhancing the outer tube surface (see, e.g., U.S. Pat. Nos. 5,697,430 and 5,996,686), only a small part of the overall tube resistance is attributable to the outside of the tube. For example, a typical evaporator tube used in a flooded chiller with an enhanced outer surface but smooth inner surface typically has a 10:1 inner resistance:outer resistance ratio. Ideally, one wants to obtain an inside to outside resistance ratio of 1:1. It becomes all the more important, therefore, to develop enhancements to the inner surface of the tube that will significantly reduce the tube side resistance and improve overall heat transfer performance of the tube.

It is known to provide heat transfer tubes with alternating grooves and ridges on their inner surfaces. The grooves and ridges cooperate to enhance turbulence of fluid heat transfer mediums, such as water, delivered within the tube. This turbulence increases the fluid mixing close to the inner tube surface to reduce or virtually eliminate the boundary layer build-up of the fluid medium close to the inner surface of the tube. The boundary layer thermal resistance significantly detracts from heat transfer performance by increasing the heat transfer resistance of the tube. The grooves and ridges also provide extra surface area for additional heat exchange. This basic premise is taught in U.S. Pat. No. 3,847,212 to Withers, Jr. et al.

The pattern, shapes and sizes of the grooves and ridges on the inner tube surface may be changed to further increase heat exchange performance. To that end, tube manufacturers have gone to great expense to experiment with alternative designs, including those disclosed in U.S. Pat. No. 5,791,405 to Takima et al., U.S. Pat. Nos. 5,332,034 and 5,458,191 to Chiang et al., and U.S. Pat. No. 5,975,196 to Gaffaney et al.

Moreover, some types of heat transfer surfaces work by using the phase change of a liquid to absorb heat. Thus, heat transfer surfaces often incorporate a surface for enhancing boiling or evaporating. It is generally known that the heat transfer performance of a surface can be enhanced by increasing nucleation sites on the boiling surfaces, by inducing agitation near a single-phase heat transfer surface, or by increasing area and surface tension effects on condensation surfaces. One method for enhancing boiling or evaporating is to roughen the heat transfer surface by sintering, radiation-melting or edging methods to form a porous layer thereon. A heat transfer surface having such a porous layer is known to exhibit better heat transfer characteristics than that of a smooth surface. However, the voids or cells formed by the above-mentioned methods are small and impurities contained in the boiling liquid may clog them so that the heat transfer performance of the surface is impaired. Additionally, since the voids or cells formed are non-uniform in size or dimension, the heat transfer performance may vary along the surface. Furthermore, known heat transfer tubes incorporating boiling or evaporating surfaces often require multiple steps or passes with tools to create the final surface.

Tube manufacturers have gone to great expense to experiment with alternative designs including those disclosed in U.S. Pat. No. 4,561,497 to Nakajima et al., U.S. Pat. No. 4,602,681 to Daikoku et al., U.S. Pat. No. 4,606,405 to Nakayama et al., U.S. Pat. No. 4,653,163 to Kuwahara et al., U.S. Pat. No. 4,678,029 to Sasaki et al., U.S. Pat. No. 4,794,984 to Lin and U.S. Pat. No. 5,351,397 to Angeli.

While all of these surface designs aim to improve the heat transfer performance of the surface, there remains a need in the industry to continue to improve upon tube designs by modifying existing and creating new designs that enhance heat transfer performance. Additionally, a need also exists to create designs and patterns that can be transferred onto heat transfer surfaces more quickly and cost-effectively. As described below, the geometries of the heat transfer surfaces of the invention, as well as tools to form those geometries, have significantly improved heat transfer performance.

SUMMARY OF THE INVENTION

The invention relates to a tool assembly that can be used to improve heat transfer surfaces, such as may be formed on a tube, and thereby enhance heat transfer performance of tubes used in at least all of the above-referenced applications (i.e., flooded evaporators, falling film evaporators, spray evaporators, absorption chillers, condensers, direct expansion coolers and single phase coolers and heaters, used in the refrigeration, chemical, petrochemical and food-processing industries).

The tool assembly includes rods having tips shaped to form the desired surfaces and positioned in a tool holder. The tool assembly is configured so that, when in use, the tips extend from the tool holder to cut the tube surface but retract within the tool holder when cutting is complete. In this way, the tips are protected from chipping or dulling when not in use. The rods are preferably made of carbide. The strongest carbide is only available in rod form. Thus, with the rod configuration of the invention, the tips may be formed of the strongest available material for cutting. Different geometries can be imparted to the rod tips so as to create different surfaces.

However, regardless of the geometry of the rod tips, the rod tips may be re-shaped multiple times before the rods must be replaced. This significantly reduces tooling and material costs. Moreover, the rods are removable from the tool assembly. Thus, when a tip becomes chipped or dull, the rod may be removed for re-shaping of its tip or replaced altogether.

The tool assembly can be used to form a plurality of protrusions on the tube surface that significantly reduce tube side resistance and improve overall heat transfer performance. The protrusions create additional paths for fluid flow within the tube and thereby enhance turbulence of heat transfer mediums flowing within the tube. This increases fluid mixing to reduce the boundary layer build-up of the fluid medium close to the inner surface of the tube, such build-up increasing the resistance and thereby impeding heat transfer. The protrusions also provide extra surface area for additional heat exchange. Formation of the protrusions in accordance with this invention can result in the formation of up to five times more surface area along the inner surface of the tube than with simple ridges.

The tool assembly may also be used to create a plurality of cavities that significantly decrease the transition time to move from one phase to the next, for example to move from single-phase to evaporation. The cavities result in thin film boiling within the cavity, and, given that the heat transfer coefficient is inversely proportional to the film thickness, thereby enhances heat transfer. Protrusions creating cavities also provide extra surface area for additional heat exchange.

The method of this invention includes using the tool assembly, which can easily be added to existing manufacturing equipment, having a cutting tip to cut through ridges on the tube surface or directly into the tube surface to create layers and to lift the layers to form the protrusions. In this way, the protrusions are formed without removal of metal from the inner surface of the tube, thereby eliminating debris which can damage the equipment in which the tubes are used. Finally, the method may also include flattening or bending the tips of the protrusions. The grooves, protrusions and flattened tips on the tube surface can be formed in the same or a different operation.

The tool assembly may be sued to enhance the inner or outer surface of a heat transfer tube or may be used on flat heat transfer surfaces, such as are used to cool micro-electronics. Such surfaces may be suitable in any number of applications, including, for example, applications for use in the HVAC, refrigeration, chemical, petrochemical and food processing industries. The physical geometries of the protrusions may be changed to tailor the tube to a particular application and fluid medium.

BRIEF DESCRIPTION OF THE DRAWINGS

FIG. 1b is a side elevation view of the tube shown in FIG. 1a in the direction of arrow a.

FIG. 1e is a top plan view of the tube shown in FIG. 1a.

FIG. 6b is a side elevation view of the tool shown in FIG. 6a.

FIG. 7a is a perspective view of an alternative embodiment of the tool of this invention.

FIG. 7b is a side elevation view of the tool shown in FIG. 7a.

FIG. 7c is a bottom plan view of the tool of FIG. 7b.

FIG. 7d is a top plan view of the tool of FIG. 7b.

DETAILED DESCRIPTION OF THE DRAWINGS

Figure 1A:
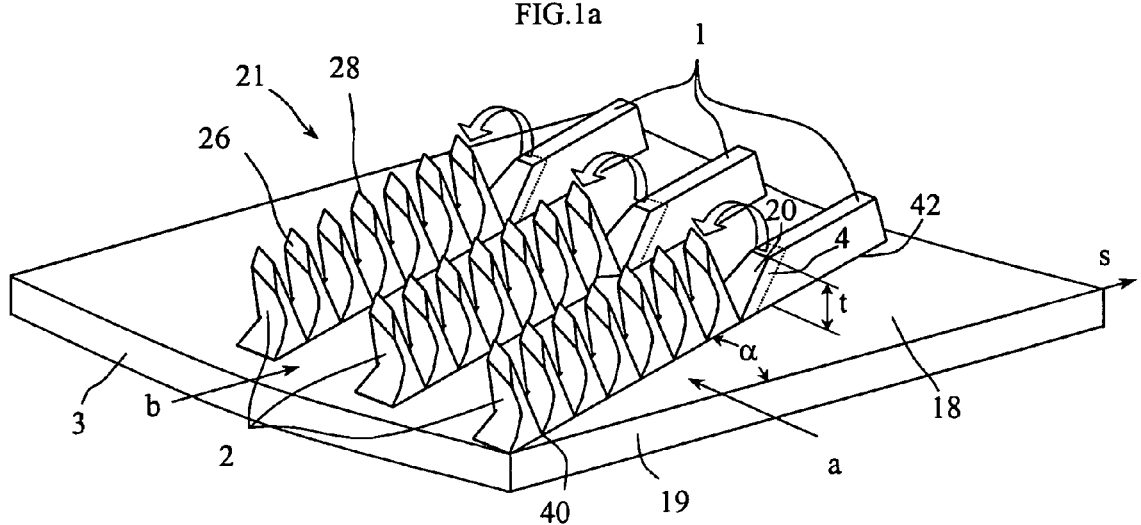
FIG. 1a is a fragmentary perspective view of the partially-formed inner surface of one embodiment of a tube of this invention.

It should be understood that a tube in accordance with this invention is generally useful in, but not limited to, any application where heat needs to be transferred from one side of the tube to the other side of the tube, such as in multi-phase (both pure liquids or gases or liquid/gas mixtures) evaporators and condensers. While the following discussion provides desirable dimensions for a tube of this invention, the tubes of this invention are in no way intended to be limited to those dimensions. Rather, the desirable geometries of the tube will depend on many factors, not the least important of which are the properties of the fluid flowing through the tube. One skilled in the art would understand how to alter the geometry of the surfaces of the tube to maximize heat transfer used in various applications and with various fluids. Furthermore, although the drawings show the surface as it would be when found on the inner surface of a tube, it should be understood that the surface is suitable for use on the outer surface of a tube or on a flat surface, such as is used in micro-electronics.

FIGS. 1*a-e* show a partially-formed inner surface 18 of one embodiment of the tube 21 of this invention. Inner surface 18 includes a plurality of protrusions 2. Protrusions 2 are formed from ridges 1 formed on inner surface 18. Ridges 1 are first formed on inner surface 18 such as by, but not limited to, deforming, cutting, broaching, or extruding. The ridges 1 are then cut to create ridge layers 4, which are subsequently lifted up to form protrusions 2 (best seen in FIGS. 1*a* and 1*b*). This cutting and lifting can be, but does not have to be, accomplished using tool 13, shown in FIGS. 6*a-d* and 7*a-d*, or tool assembly 510, shown in FIGS. 25-34, both of which are described below.

Ridges 1 are formed on inner surface 18 at a helix angle $\alpha$ to the axis s of the tube (see FIGS. 1*a* and 1*e*). Helix angle $\alpha$ may be any angle between 0°-90°, but preferably does not exceed 70°. One skilled in the art will readily understand that the preferred helix angle $\alpha$ will often depend, at least in part, on the fluid medium used. The height $e_r$ of ridges 1 should generally be greater the more viscous the liquid flowing through tube 21. For example, a height $e_r$ of greater than zero (preferably, but not necessarily, at least 0.001 inches) up to 25% of the inside diameter of the tube ($D_i$) will generally be desirable in a tube sample used with highly viscous liquids at low temperatures. For purposes of this application, $D_i$ is the inside diameter of tube 21 measured from inner surface 18 of tube 21. The axial pitch $P_{a,r}$ of ridges 1 depends on many factors, including helix angle a, the number of ridges 1 formed on inner surface 18 of tube 21, and the inside diameter $D_i$ of tube 21. While any pitch $P_{a,r}$ may be used, the ratio of $P_{a,r}/e_r$ is preferably at least 0.002, and the ratio of $e_r/D_i$ is preferably between approximately 0.001-0.25. Again, however, one skilled in the art will readily understand that these preferred ratio values will often depend, at least in part, on the fluid medium used and operating conditions (e.g., the temperature of the fluid medium).

Figure 1B:
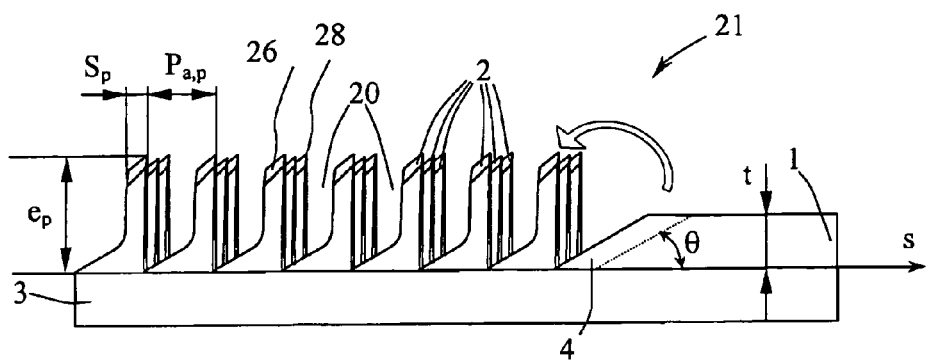
Figure 1C:
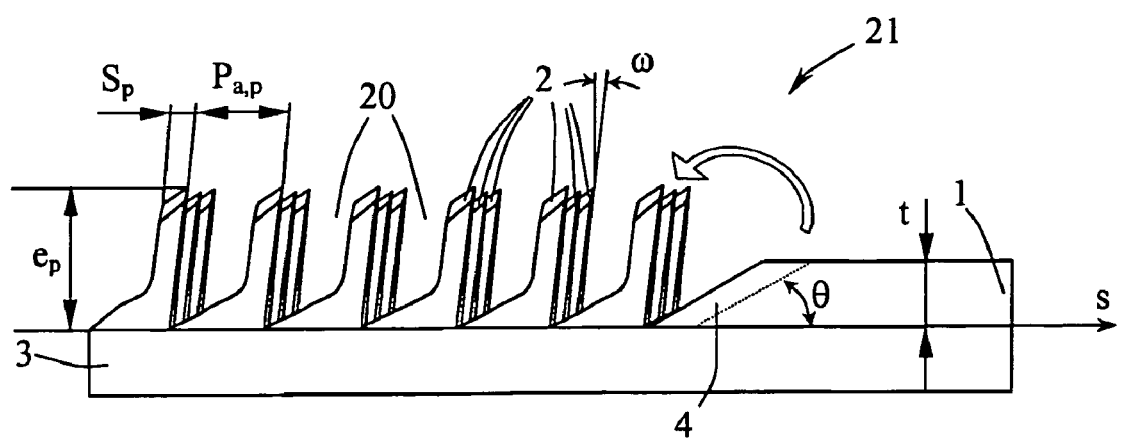
FIG. 1c is a side elevation view similar to FIG. 1b except that the protrusions protrude from the inner surface of the tube in a direction that is not perpendicular to tube axis S.
Figure 1D:
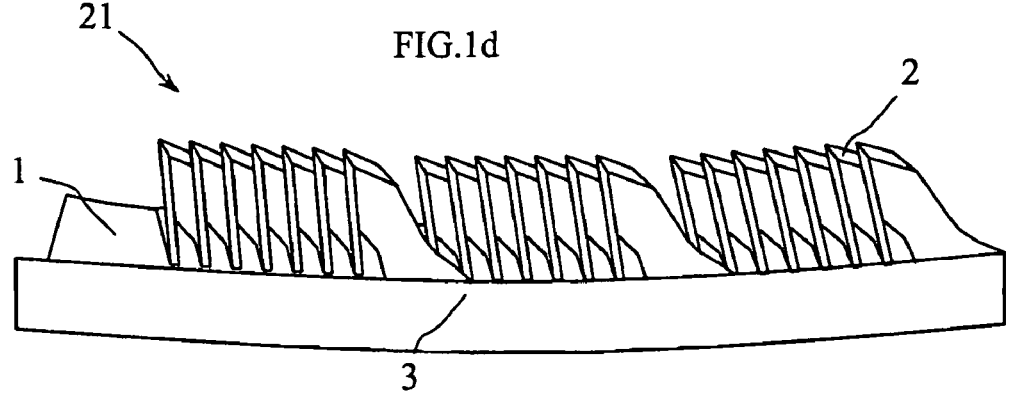
FIG. 1d is a front elevation view of the tube shown in FIG. 1a in the direction of arrow b.
Figure 2:
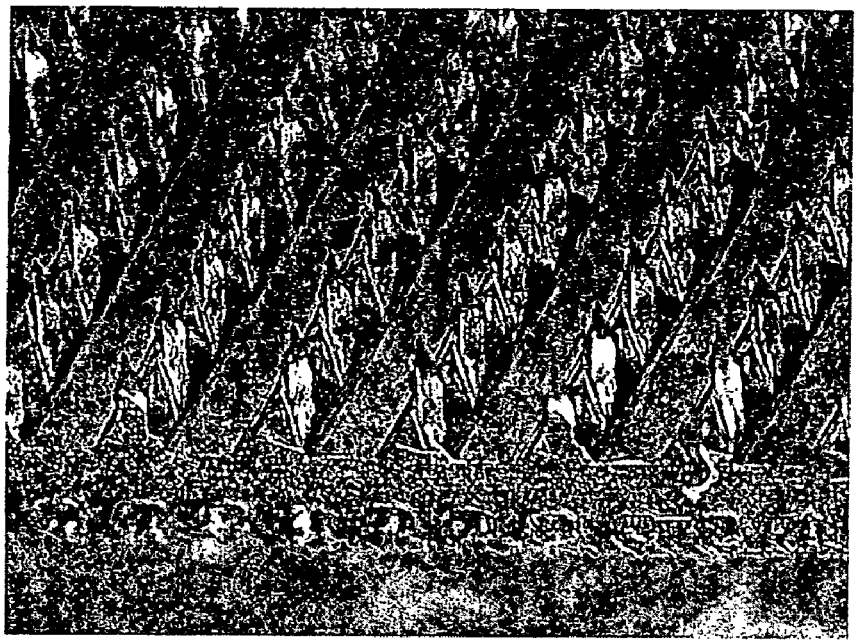
FIG. 2 is a photomicrograph of an inner surface of one embodiment of a tube of this invention.
Figure 3:
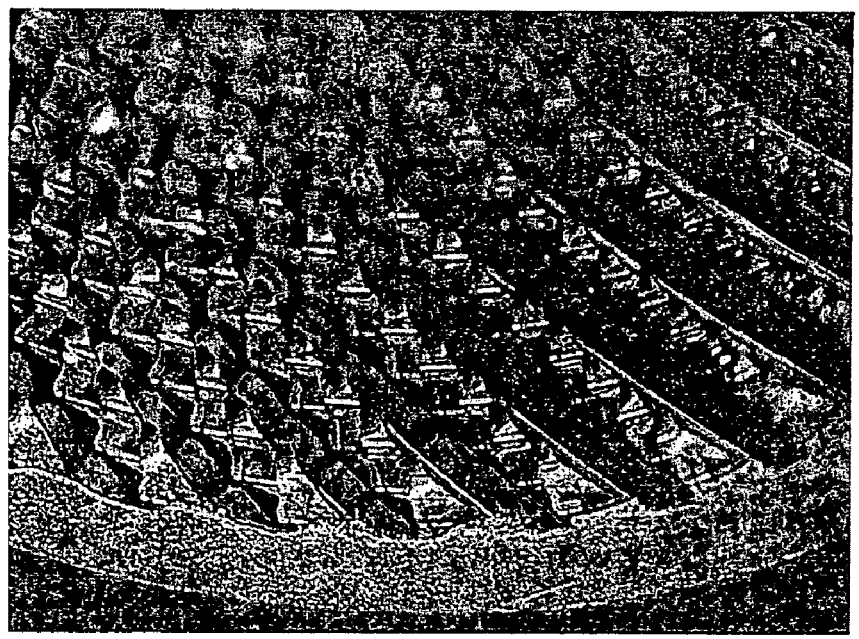
FIG. 3 is a photomicrograph of an inner surface of an alternative embodiment of a tube of this invention.
Figure 8A:
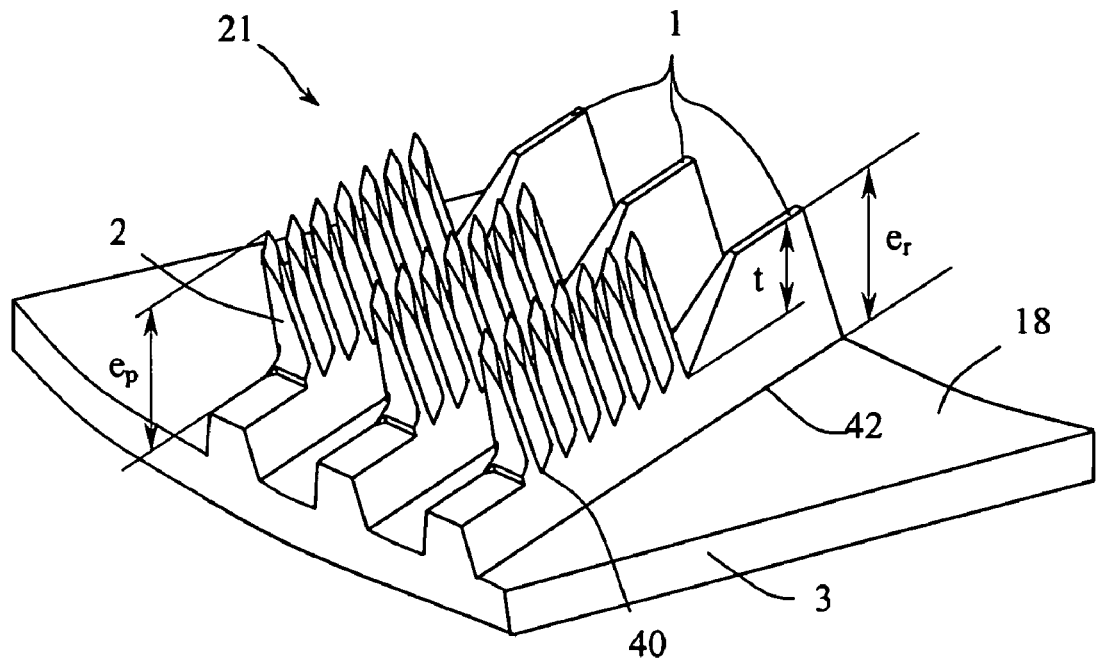
FIG. 8a is a fragmentary perspective view of the partially-formed inner surface of an alternative embodiment of a tube of this invention where the depth of the cut through the ridges is less than the ridge height.
Figure 8B:
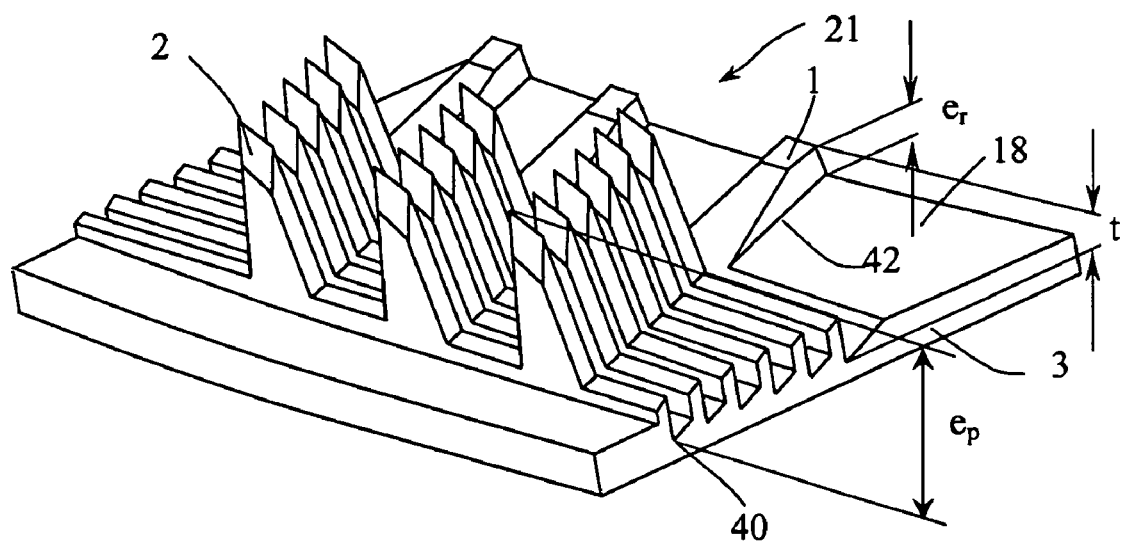
FIG. 8b is a fragmentary perspective view of the partially-formed inner surface of an alternative embodiment of a tube of this invention where the depth of the cut through the ridges is greater than the ridge height.

Ridge layers 4 are cut at an angle $\theta$ to axis s that is preferably between approximately 20°-50°, inclusive, and more preferably around 30°. The axial pitch $P_{a,p}$ of protrusions 2 may be any value greater than zero and generally will depend on, among other factors, the relative revolutions per minute between the tool (discussed below) and the tube during manufacture, the relative axial feed rate between the tool and the tube during manufacture, and the number of tips provided on the tool used to form the protrusions during manufacture. While the resulting protrusions 2 can have any thickness $S_p$, the thickness $S_p$ is preferably approximately 20-100% of pitch $P_{a,p}$. The height $e_p$ of protrusions 2 is dependent on the cutting depth t (as seen in FIGS. 1b, 8a, and 8b) and angle θ at which the ridge layers 4 are cut. The height $e_p$ of protrusions 2 is preferably a value at least as great as the cutting depth t up to three times the cutting depth t. It is preferable, but not necessary, to form ridges 1 at a height $e_r$ and set the cutting angle θ at a value that will result in the height $e_p$ of protrusions 2 being at least approximately double the height $e_r$ of ridges 1. Thus, the ratio of $e_p/D_i$ is preferably between approximately 0.002-0.5 (i.e., $e_p/D_i$ is double the preferred range of the ratio $e_r/D_i$ of approximately 0.001-0.25).

FIGS. 1a and 1b show cutting depth t equal to the height $e_r$ of ridges 1 so that the base 40 of protrusion 2 is located on the inner surface 18 of tube 21. The cutting depth t need not be equal to the ridge height $e_r$, however. Rather, the ridges 1 can be cut only partially through ridges 1 (see FIG. 8a) or beyond the height of ridges 1 and into tube wall 3 (see FIG. 8b). In FIG. 8a, the ridges 1 are not cut through their entire height $e_r$, so that the base 40 of protrusions 2 is positioned further from the inner surface 18 of tube 21 than the base 42 of ridges 1, which is located on the inner surface 18. In contrast, FIG. 8b illustrates a cutting depth t of beyond the ridge height $e_r$, so that at least one wall of the protrusions 2 extends into tube wall 3, beyond the inner surface 18 and ridge base 42.

Figure 11A:
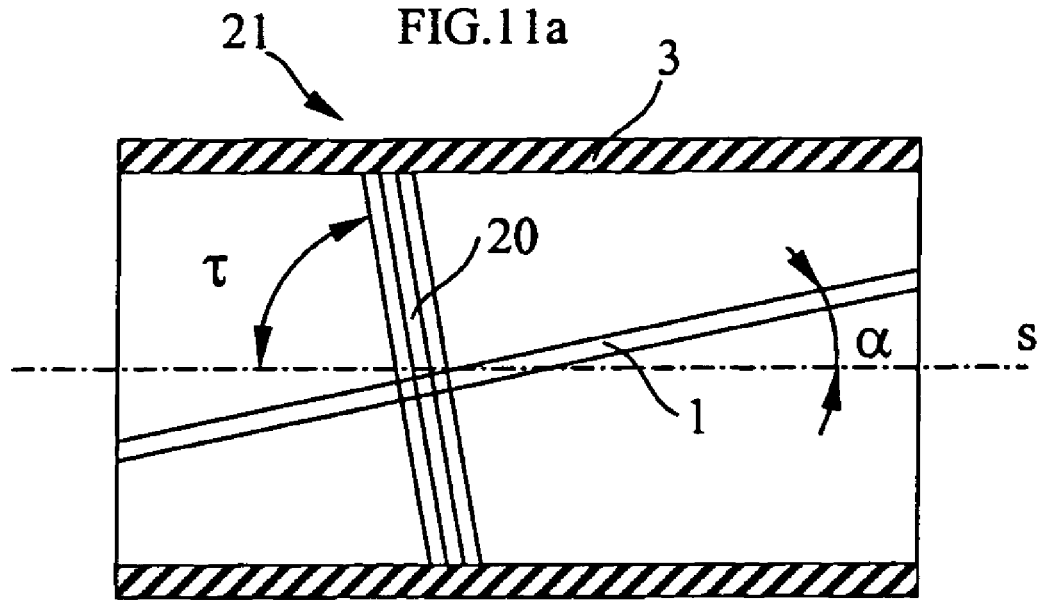
FIG. 11a is a schematic of the inner surface of a tube in accordance with this invention showing the angular orientation between the ridges and grooves, whereby the ridges and grooves are opposite hand helix.
Figure 11B:
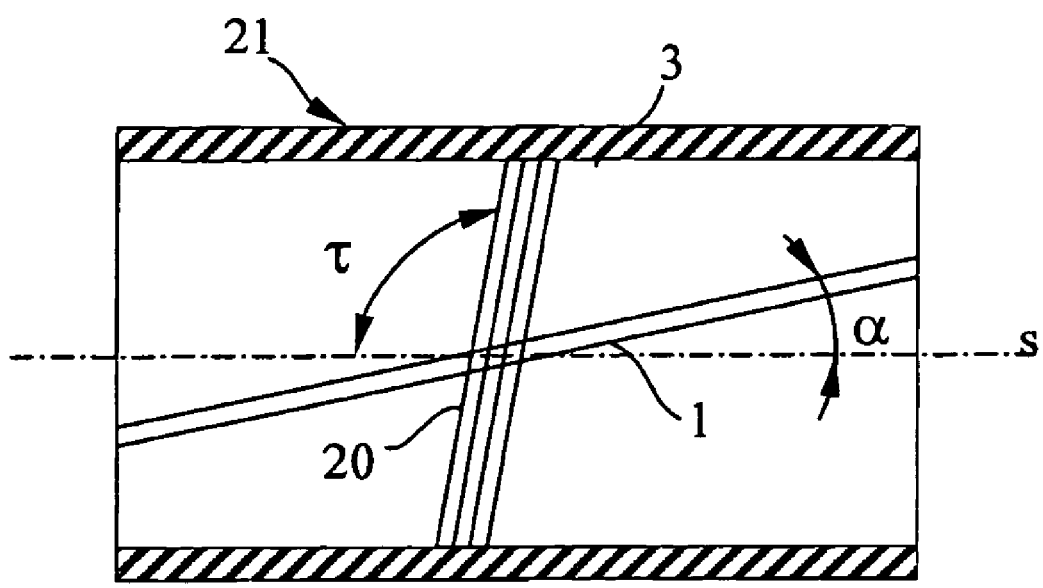
FIG. 11b is a schematic of the inner surface of a tube in accordance with this invention showing the angular orientation between the ridges and grooves, whereby the ridges and grooves are same hand helix.

When ridge layers 4 are lifted, grooves 20 are formed between adjacent protrusions 2. Ridge layers 4 are cut and lifted so that grooves 20 are oriented on inner surface 18 at an angle τ to the axis s of tube 21 (see FIGS. 1e, 11a, and 11b), which is preferably, but does not have to be, between approximately 80°-100°.

The shape of protrusions 2 is dependent on the shape of ridges 1 and the orientation of ridges 1 relative to the direction of movement of tool 13. In the embodiment of FIGS. 1a-e, protrusions 2 have four side surfaces 25, a sloped top surface 26 (which helps decrease resistance to heat transfer), and a substantially pointed tip 28. The protrusions 2 of this invention are in no way intended to be limited to this illustrated embodiment, however, but rather can be formed in any shape. Moreover, protrusions 2 in tube 21 need not all be the same shape or have the same geometry.

Figure 10A:
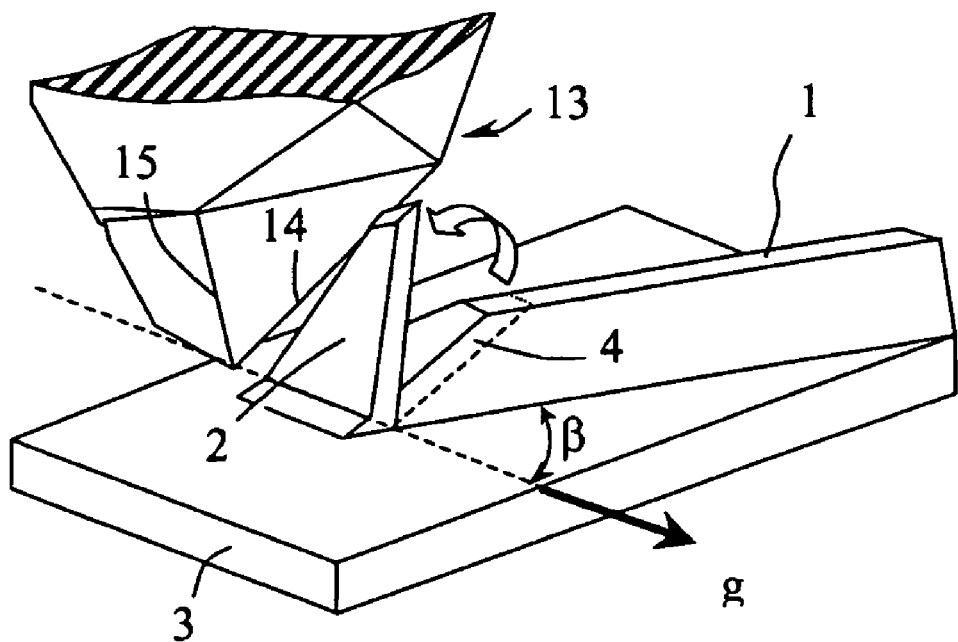
FIG. 10a is a fragmentary view of an inner surface of a tube of this invention, showing the tool approaching the ridge in direction g for cutting a protrusion from the ridge in direction g.
Figure 10:
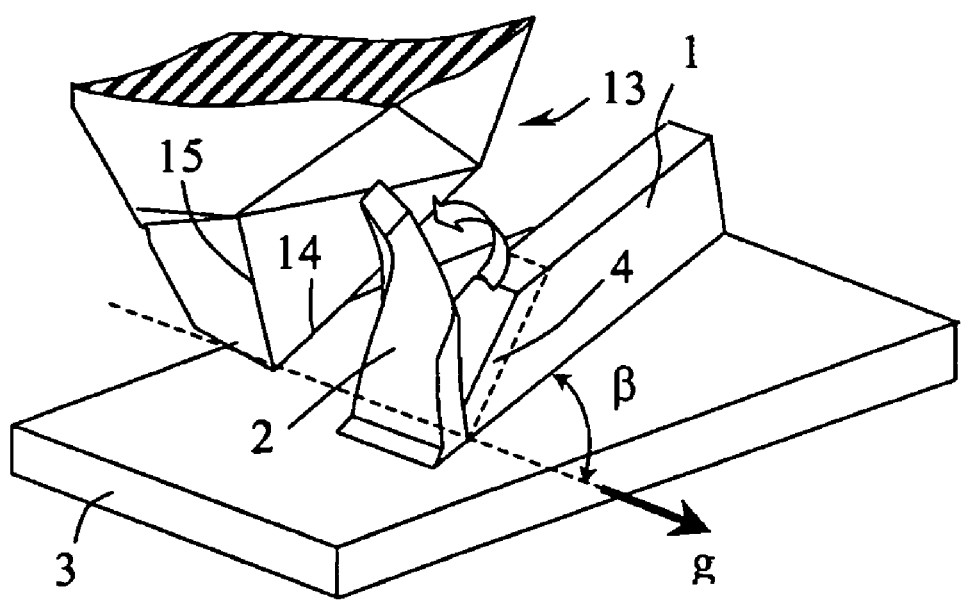
FIG. 10b is a fragmentary view of an alternative inner surface of a tube of this invention showing the tool approaching the ridge in direction g for cutting a protrusion from the ridge in direction g.

Whether the orientation of protrusions 2 is straight (see FIG. 10a) or bent or twisted (see FIG. 10b) depends on the angle β formed between ridges 1 and the direction of movement g of tool 13. If angle β is less than 90°, protrusions 2 will have a relatively straight orientation, such as is shown in FIG. 10a. If angle β is more than 90°, protrusions 2 will have a more bent and/or twisted orientation, such as, for example, is shown in FIG. 10b.

Tool 13 may be used to cut through ridges 1 and lift the resulting ridge layers 4 to form protrusions 2. Other devices and methods for forming protrusions 2 may be used, however. Tool 13 can be made from any material having the structural integrity to withstand metal cutting (e.g. steel, carbide, ceramic, etc.), but is preferably made of a carbide. The embodiments of the tool 13 shown in FIGS. 6a-d and 7a-d generally have a tool axis q, two base walls 30, 32 and one or more side walls 34. Aperture 16 is located through the tool 13. Tips 12 are formed on side walls 34 of tool 13. Note, however, that the tips can be mounted or formed on any structure that can support the tips in the desired orientation relative to the tube 21 and such structure is not limited to that disclosed in FIGS. 6a-d and 7a-d. Moreover, the tips may be retractable within their supporting structure so that the number of tips used in the cutting process can easily be varied.

FIGS. 6a-d illustrate one embodiment of tool 13 having a single tip 12. FIGS. 7a-d illustrate an alternative embodiment of tool 13 having four tips 12. One skilled in the art will understand that tool 13 may be equipped with any number of tips 12 depending on the desired pitch $P_{a,p}$ of protrusions 2.

Moreover, the geometry of each tip need not be the same for tips on a single tool 13. Rather, tips 12 having different geometries to form protrusions having different shapes, orientations, and other geometries may be provided on tool 13.

Each tip 12 is formed by the intersection of planes A, B, and C. The intersection of planes A and B form cutting edge 14 that cuts through ridges 1 to form ridge layers 4. Plane B is oriented at an angle ϕ relative to a plane perpendicular to the tool axis q (see FIG. 6b). Angle ϕ is defined as 90°−θ. Thus, angle ϕ is preferably between approximately 40°-70° to allow cutting edge 14 to slice through ridges 1 at the desirable angle θ between approximately 20°-50°.

The intersection of planes A and C form lifting edge 15 that lifts ridge layers 4 upwardly to form protrusions 2. Angle $ϕ_1$, defined by plane C and a plane perpendicular to tool axis q, determines the angle of inclination ω (the angle between a plane perpendicular to the longitudinal axis s of tube 21 and the longitudinal axis of protrusions 2 (see FIG. 1c)) at which protrusions 2 are lifted by lifting edge 15. Angle $ϕ_1$=angle ω, and thus angle $ϕ_1$ on tool 13 can be adjusted to directly impact the angle of inclination ω of protrusions 2. The angle of inclination ω (and angle $ω_1$) is preferably the absolute value of any angle between approximately −45° to 45° relative to the plane perpendicular to the longitudinal axis s of tube 21. In this way, protrusions can be aligned with the plane perpendicular to the longitudinal axis s of tube 21 (see FIG. 1b) or incline to the left and right relative to the plane perpendicular to the longitudinal axis s of tube 21 (see FIG. 1c). Moreover, the tips 12 can be formed to have different geometries (i.e., angle $ϕ_1$ may be different on different tips), and thus the protrusions 2 within tube 21 may incline at different angles (or not at all) and in different directions relative to the plane perpendicular to the longitudinal axis s of tube 21.

While preferred ranges of values for the physical dimensions of protrusions 2 have been identified, one skilled in the art will recognize that the physical dimensions of tool 13 may be modified to impact the physical dimensions of resulting protrusions 2. For example, the depth t that cutting edge 14 cuts into ridges 1 and angle ϕ affect the height $e_p$ of protrusions 2. Therefore, the height $e_p$ of protrusions 2 may be adjusted using the expression $$e_p = t/\sin(90-ϕ)$$

or, given that ϕ=90−θ, $$e_p = t/\sin(θ)$$

Where:

t is the cutting depth;

ϕ is the angle between plane B and a plane perpendicular to tool axis q; and

θ is the angle at which the ridge layers 4 are cut relative to the longitudinal axis s of the tube 21.

Thickness $S_p$ of protrusions 2 depends on pitch $P_{a,p}$ of protrusions 2 and angle ϕ. Therefore, thickness $S_p$ can be adjusted using the expression $$S_p = P_{a,p} \cdot \sin(90-ϕ)$$

or, given that ϕ=90−θ, $$S_p = P_{a,p} \cdot \sin(θ)$$

Where:

$P_{a,p}$ is the axial pitch of protrusions 2;

ϕ is the angle between plane B and a plane perpendicular to tool axis q; and

θ is the angle at which the ridge layers 4 are cut relative to the longitudinal axis s of the tube 21.

Figure 4:
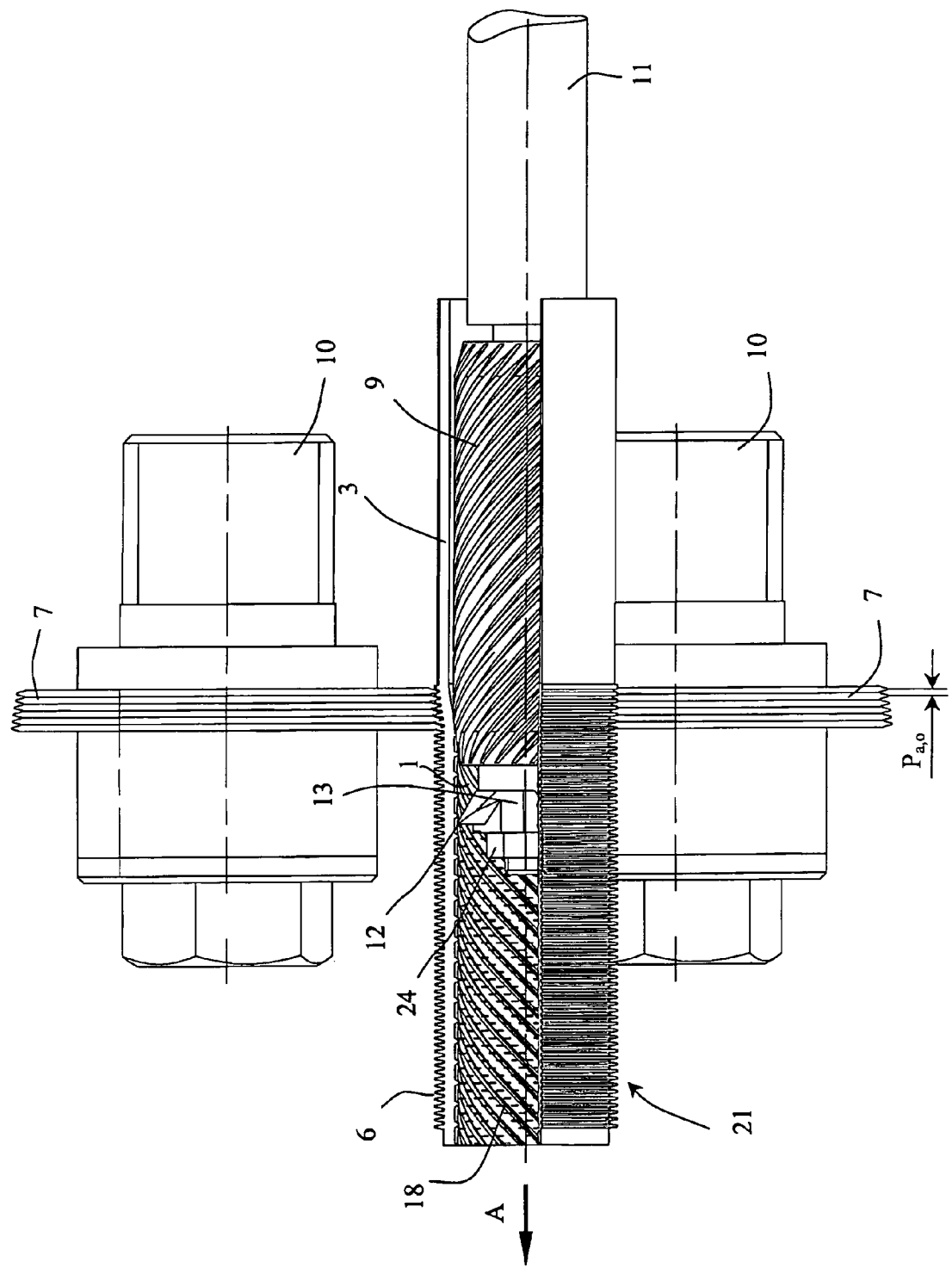
FIG. 4 is a side elevation view of one embodiment of the manufacturing equipment that can be used to produce tubes in accordance with this invention.
Figure 5:
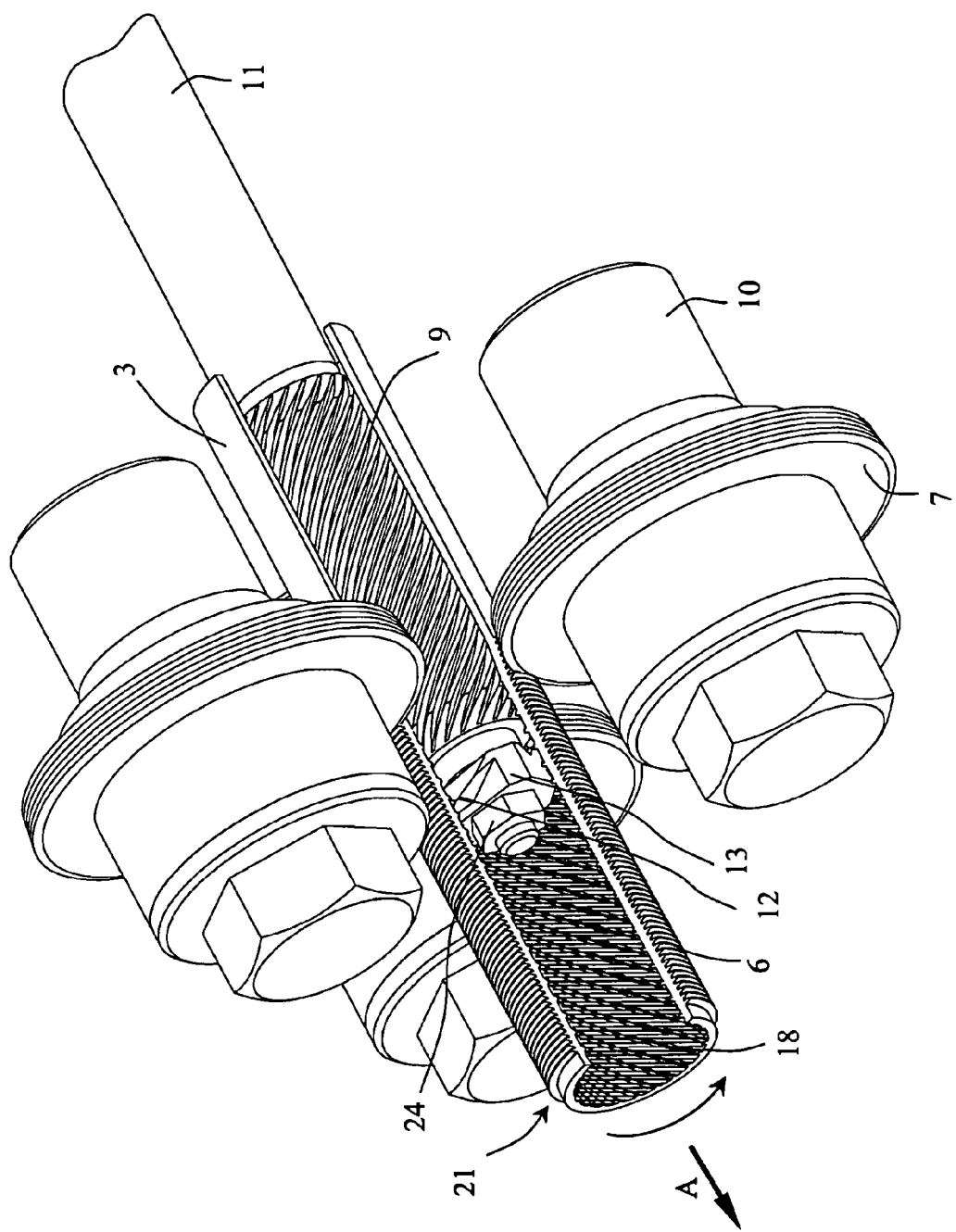
FIG. 5 is a perspective view of the equipment of FIG. 4.

FIGS. 4 and 5 illustrate one possible manufacturing set-up for enhancing the surfaces of tube 21. These figures are in no way intended to limit the process by which tubes in accordance with this invention are manufactured, but rather any tube manufacturing process using any suitable equipment or configuration of equipment may be used. The tubes of this invention may be made from a variety of materials possessing suitable physical properties including structural integrity, malleability, and plasticity, such as, for example, copper and copper alloys, aluminum and aluminum alloys, brass, titanium, steel, and stainless steel. FIGS. 4 and 5 illustrate three arbors 10 operating on tube 21 to enhance the outer surface of tube 21. Note that one of the arbors 10 has been omitted from FIG. 4. Each arbor 10 includes a tool set-up having finning disks 7 which radially extrude from one to multiple start outside fins 6 having axial pitch $P_{a,o}$. The tool set-up may include additional disks, such as notching or flattening disks, to further enhance the outer surface of tube 21. Moreover, while only three arbors 10 are shown, fewer or more arbors may be used depending on the desired outer surface enhancements. Note, however, that depending on the tube application, enhancements need not be provided on the outer surface of tube 21 at all.

In one example of a way to enhance inner surface 18 of tube 21, a mandrel shaft 11 onto which mandrel 9 is rotatably mounted extends into tube 21. Tool 13 is mounted onto shaft 11 through aperture 16. Bolt 24 secures tool 13 in place. Tool 13 is preferably locked in rotation with shaft 11 by any suitable means. FIGS. 6d and 7d illustrate a key groove 17 that may be provided on tool 13 to interlock with a protrusion on shaft 11 (not shown) to fix tool 13 in place relative to shaft 11.

In operation, tube 21 generally rotates as it moves through the manufacturing process. Tube wall 3 moves between mandrel 9 and finning disks 7, which exert pressure on tube wall 3. Under pressure, the metal of tube wall 3 flows into the grooves between the finning disks 7 to form fins 6 on the exterior surface of tube 21.

The mirror image of a desired inner surface pattern is provided on mandrel 9 so that mandrel 9 will form inner surface 18 of tube 21 with the desired pattern as tube 21 engages mandrel 9. A desirable inner surface pattern includes ridges 1, as shown in FIGS. 1a and 4. After formation of ridges 1 on inner surface 18 of tube 21, tube 21 encounters tool 13 positioned adjacent and downstream mandrel 9. As explained previously, the cutting edge(s) 14 of tool 13 cuts through ridges 1 to form ridge layers 4. Lifting edge(s) 15 of tool 13 then lift ridge layers 4 to form protrusions 2.

When protrusions 2 are formed simultaneously with outside finning and tool 13 is fixed (i.e., not rotating or moving axially), tube 21 automatically rotates and has an axial movement. In this instance, the axial pitch of protrusions $P_{a,p}$ is governed by the following formula:

$$P_{a,p} = \frac{P_{a,o} \cdot Z_o}{Z_i}$$

Where:
$P_{a,o}$ is the axial pitch of outside fins 6;
$Z_o$ is the number of fin starts on the outer diameter of tube 21; and
$Z_i$ is the number of tips 12 on tool 13.

To obtain a specific protrusion axial pitch $P_{a,p}$, tool 13 can also be rotated. Both tube 21 and tool 13 can rotate in the same direction or, alternatively, both tube 21 and tool 13 can rotate, but in opposite directions. To obtain a predetermined axial protrusion pitch $P_{a,p}$, the necessary rotation (in revolutions per minute (RPM)) of the tool 13 can be calculated using the following formula:

$$RPM_{tool} = \frac{RPM_{tube}(P_{a,o} \cdot Z_o - P_{a,p} \cdot Z_i)}{Z_i \cdot P_{a,p}}$$

Where:
$RPM_{tube}$ is the frequency of rotation of tube 21;
$P_{a,o}$ is the axial pitch of outer fins 6;
$Z_o$ is the number of fin starts on the outer diameter of tube 21;
$P_{a,p}$ is the desirable axial pitch of protrusions 2; and
$Z_i$ is the number of tips 12 on tool 13.

If the result of this calculation is negative, then tool 13 should rotate in the same direction of tube 21 to obtain the desired pitch $P_{a,p}$. Alternatively, if the result of this calculation is positive, then tool 13 should rotate in the opposite direction of tube 21 to obtain the desired pitch $P_{a,p}$.

Note that while formation of protrusions 2 is shown in the same operation as formation of ridges 1, protrusions 2 may be produced in a separate operation from firming using a tube with pre-formed inner ridges 1. This would generally require an assembly to rotate tool 13 or tube 21 and to move tool 13 or tube 21 along the tube axis. Moreover, a support is preferably provided to center tool 13 relative to the inner tube surface 18.

In this case, the axial pitch $P_{a,p}$ of protrusions 2 is governed by the following formula:

$$P_{a,p} = X_a/(RPM \cdot Z_i)$$

Where:
$X_a$ is the relative axial speed between tube 21 and tool 13 (distance/time);
RMP is the relative frequency of rotation between tool 13 and tube 21;
$P_{a,p}$ is the desirable axial pitch of protrusions 2; and
$Z_i$ is the number of tips 12 on tool 13.

This formula is suitable when (1) the tube moves only axially (i.e., does not rotate) and the tool only rotates (i.e., does not move axially); (2) the tube only rotates and the tool moves only axially; (3) the tool rotates and moves axially but the tube is both rotationally and axially fixed; (4) the tube rotates and moves axially but the tool is both rotationally and axially fixed; and (5) any combination of the above.

Figure 9A:
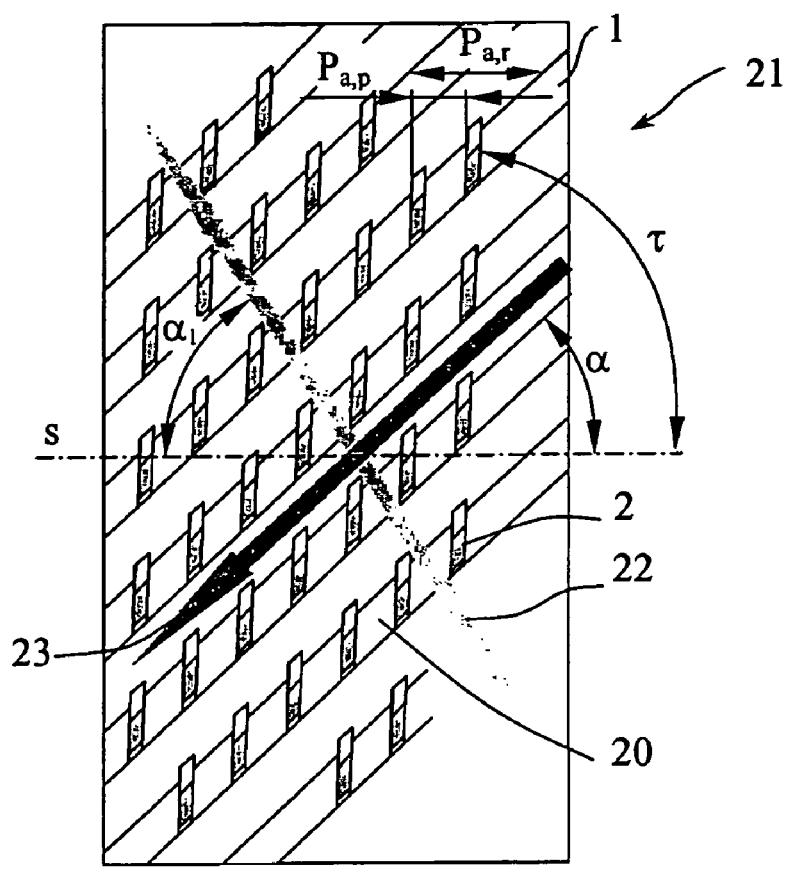
FIG. 9a is a fragmentary top plan view of the inner surface of another embodiment of a tube in accordance with this invention.
Figure 9B:
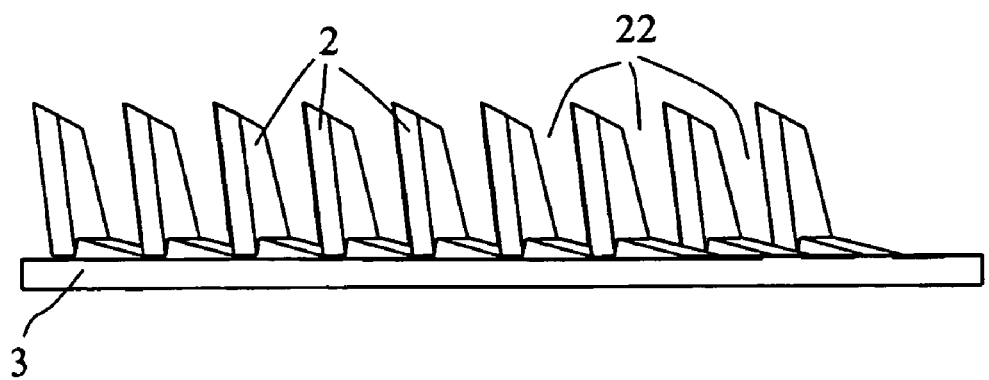
FIG. 9b is an elevation view of the tube shown in FIG. 9a in the direction of arrow 22.

With the inner tube surface of this invention, additional paths for fluid flow are created (between protrusions 2 through grooves 20) to optimize heat transfer and pressure drop. FIG. 9a illustrates these additional paths 22 for fluid travel through tube 21. These paths 22 are in addition to fluid flow paths 23 created between ridges 1. These additional paths 22 have a helix angle $\alpha_1$ relative to the tube axis s. Angle $\alpha_1$ is the angle between protrusions 2 formed from adjacent ridges 1. FIG. 9b clearly shows these additional paths 22 formed between protrusions 2. Helix angle $\alpha_1$, and thus orientation of paths 22 through tube 21, can be adjusted by adjusting pitch $P_{a,p}$ of protrusions 2 using the following expression $$P_{a,p} = \frac{P_{a,r} \cdot \tan(\alpha) \cdot \pi D_i}{\pi D_i \cdot (\tan(\alpha) + \tan(\alpha_1)) \pm P_{a,r} \cdot \tan(\alpha) \cdot \tan(\alpha_1) \cdot Z_i}$$

Where:

$P_{a,r}$ is the axial pitch of ridges 1;
α is the angle of ridges 1 to tube axis s;
$\alpha_1$ is the desirable helix angle between protrusions 2;
$Z_i$ is the number of tips 12 on tool 13; and
$D_i$ is the inside diameter of tube 21 measured from inner surface 18 of tube 21.

If ridge helix angle α and angle τ of grooves 20 are both either right hand or left hand helix (see FIG. 11b), then the "[−]" should be used in the above expression. Alternatively, if ridge helix angle α and angle τ of grooves 20 are opposite hand helix (see FIG. 11a), then the "[+]" should be used in the above expression.

Figure 12:
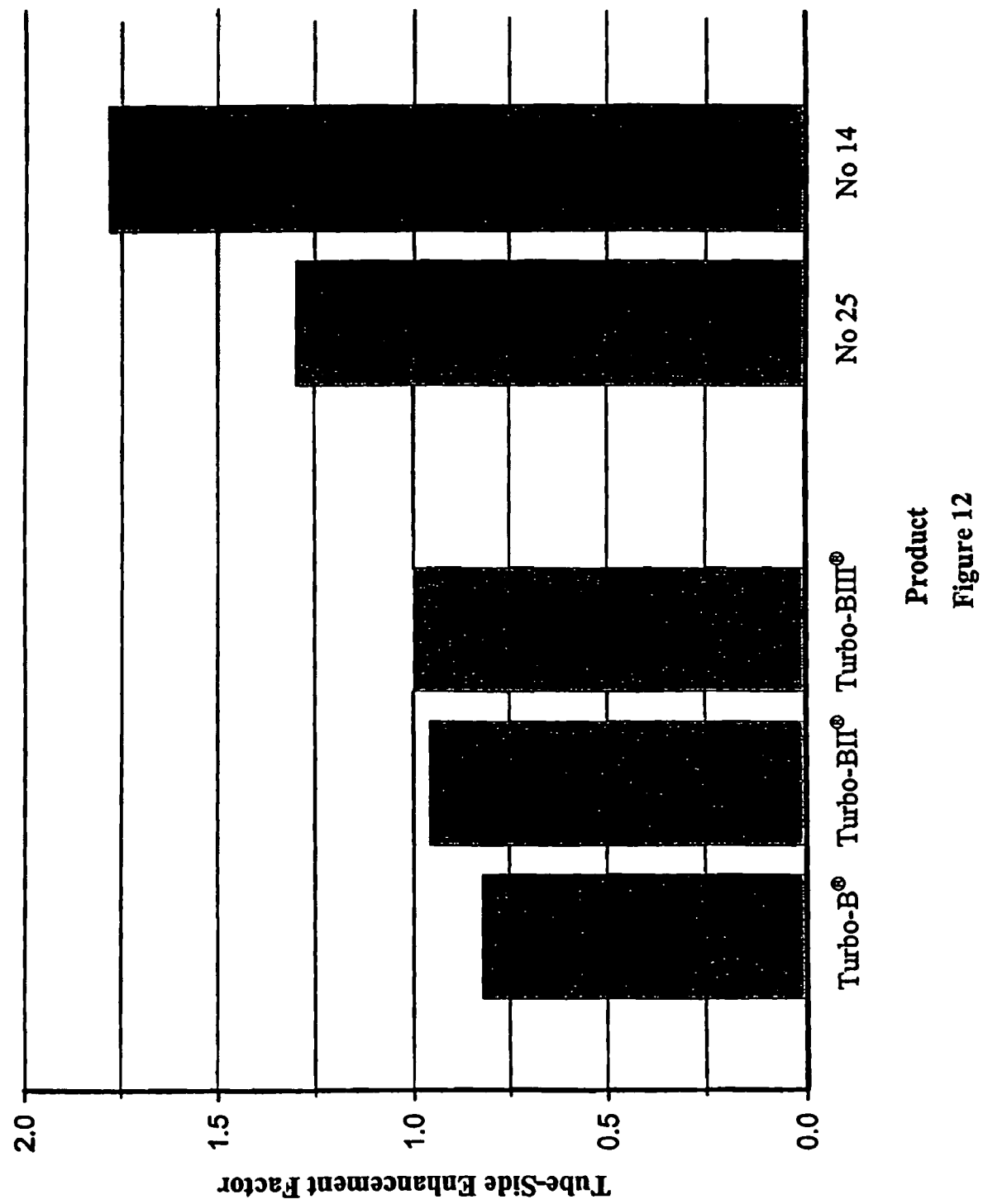
FIG. 12 is a bar graph comparing the tube-side heat transfer coefficients of various tubes of the prior art and of tubes in accordance with this invention.
Figure 13:
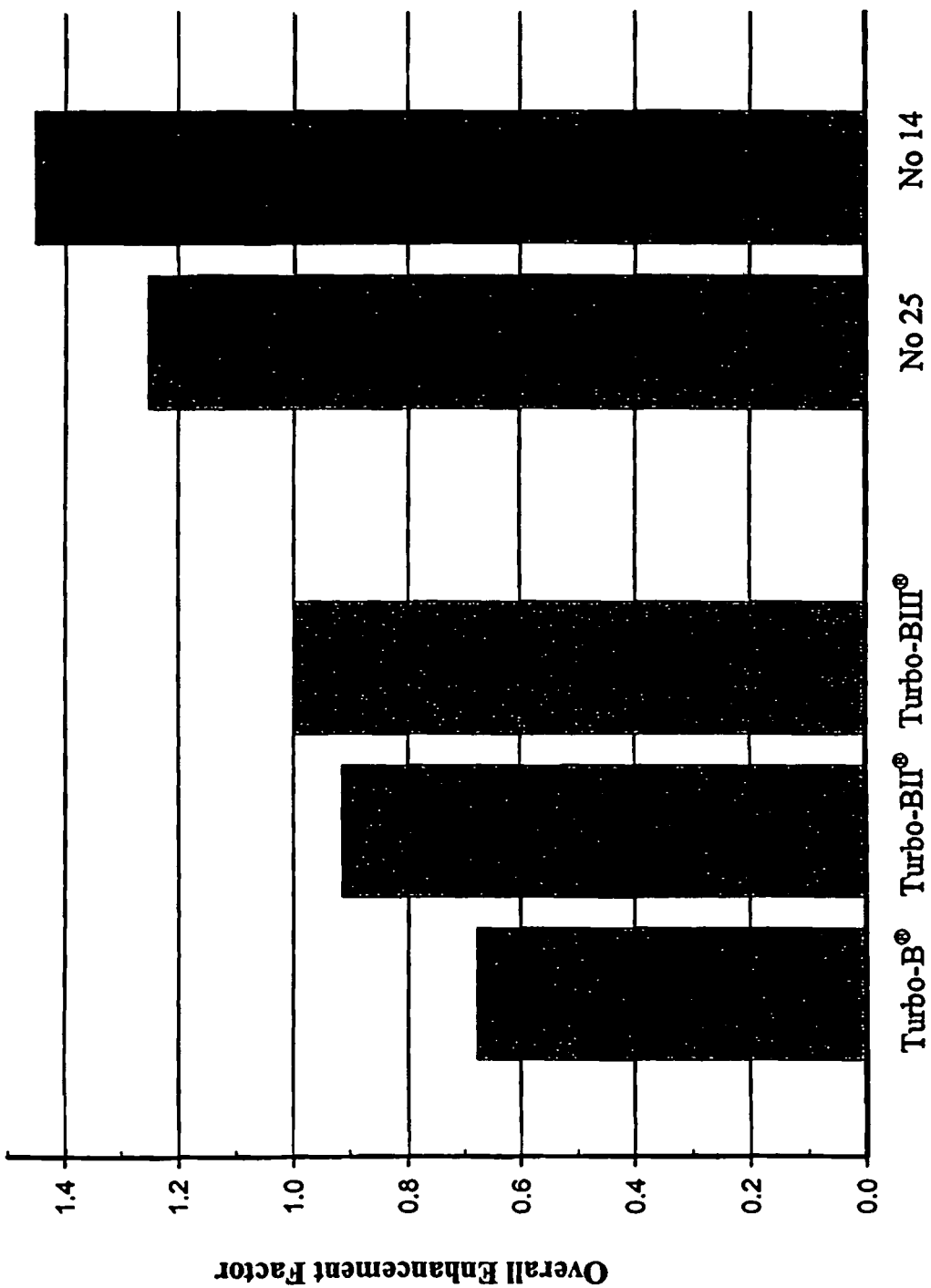
FIG. 13 is bar graph comparing the overall heat transfer coefficients of various tubes of the prior art and of tubes in accordance with this invention.

Tubes having the surfaces described above outperform existing tubes. FIGS. 12 and 13 graphically illustrate the enhanced performance of two examples of such tubes (boiling tubes Tube No. 25 and Tube No. 14) by demonstrating the differences in the enhancement factors between these tubes. The enhancement factor is the factor by which the heat transfer coefficients (both tube-side (see FIG. 12) and overall (see FIG. 13)) of these new tubes (Tube No. 25 and Tube No. 14) increase over existing tubes (Turbo-B®, Turbo-BII®, and Turbo B-III®). Again, however, Tube Nos. 25 and 14 are merely examples of tubes in accordance with this invention. Other types of tubes made in accordance with this invention outperform existing tubes in a variety of applications.

The physical characteristics of the Turbo-B®, Turbo-BII®, and Turbo B-III® tubes are described in Tables 1 and 2 of U.S. Pat. No. 5,697,430 to Thors, et al. Turbo-B® is referenced as Tube II; Turbo-BII® is referenced as Tube III; and Turbo B-III® is referenced as Tube $IV_H$. The outside surfaces of Tube No. 25 and Tube No. 14 are identical to that of Turbo B-III®. The inside surfaces of Tube No. 25 and Tube No. 14 are in accordance with this invention and include the following physical characteristics:

TABLE 1

Tube and Ridge Dimensions

|  | Tube No. 25 | Tube No. 14 |
|---|---|---|
| Outside Diameter of Tube (inches) | 0.750 | 0.750 |
| Inside Diameter of Tube $D_i$ (inches) | 0.645 | 0.650 |
| Number of Inner Ridges | 85 | 34 |
| Helix Angle α of Inner Ridges (degrees) | 20 | 49 |
| Inner Ridge Height $e_r$ (inches) | 0.0085 | 0.016 |
| Inner Ridge Axial Pitch $P_{a,r}$ (inches) | 0.065 | 0.052 |
| $P_{a,r}/e_r$ | 7.65 | 3.25 |
| $e_r/D_i$ | 0.0132 | 0.025 |

TABLE 2

Protrusion Dimensions

|  | Tube No. 25 | Tube No. 14 |
|---|---|---|
| Protrusion Height $e_p$ (inches) | 0.014 | 0.030 |

TABLE 2-continued

Protrusion Dimensions

|  | Tube No. 25 | Tube No. 14 |
|---|---|---|
| Protrusion Axial Pitch $P_{a,p}$ (inches) | 0.0167 | 0.0144 |
| Protrusion Thickness $S_p$ (inches) | 0.0083 | 0.007 |
| Depth of Cut into Ridge t (inches) | 0.007 | 0.015 |

Moreover, the tool used to form the protrusions on Tube Nos. 25 and 14 had the following characteristics:

TABLE 3

Tool Dimensions

|  | Tube No. 25 | Tube No. 14 |
|---|---|---|
| Number of Cutting Tips $Z_i$ | 3 | 1 |
| Angle ϕ (degrees) | 60° | 60° |
| Angle ω (degrees) | 2° | 2° |
| Angle τ (degrees) | 89.5° | 89.6° |
| Angle β (degrees) | 69.5° | 40.6° |
| Number of Outside Diameter Fin Starts | 3 | N/A |
| Tool Revolution per Minute | 0 | 1014 |
| Tube Revolution per Minute | 1924 | 0 |
| $X_a$ (inches/minute) | 96.2 | 14.7 |

FIG. 12 shows that the tube-side heat transfer coefficient of Tube No. 14 is approximately 1.8 times and Tube No. 25 is approximately 1.3 times that of Turbo B-III®, which is currently the most popular tube used in evaporator applications and shown as a baseline in FIGS. 12 and 13. Similarly, FIG. 13 shows that the overall heat transfer coefficient of Tube No. 25 is approximately 1.25 times and Tube No. 14 is approximately 1.5 times that of Turbo B-III.

Figure 14:
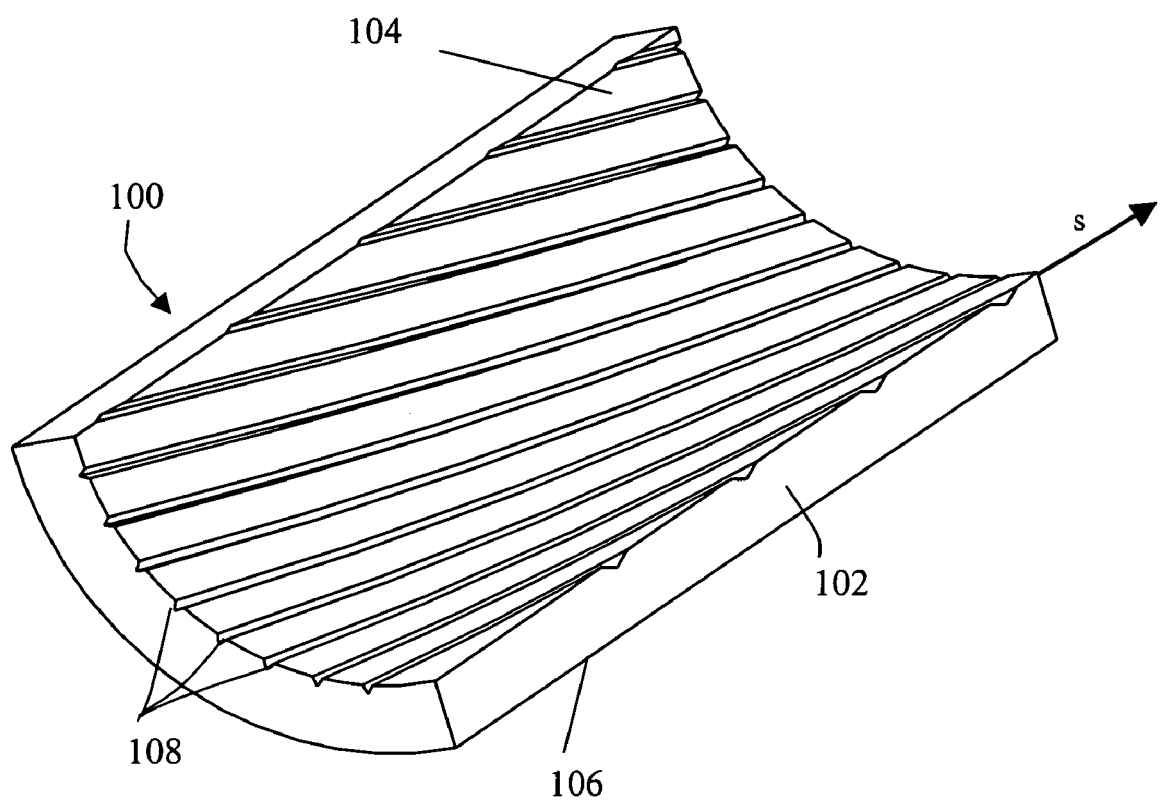
FIG. 14 is a fragmentary perspective view of a partially-formed boiling surface on the inner diameter of a heat transfer tube according to an embodiment of the invention.

As shown in FIG. 14, other embodiments of the invention include heat transfer surfaces with primary grooves 108 on the inner surface 104 of tube 100, also having an outer surface 106 and tube wall 102. As one skilled in the art will understand, the number of primary grooves 108 may vary depending on the application in which the heat transfer surface is to be used and depending on the fluid medium used. Primary grooves 108 may be formed by any method including, but not limited to, cutting, deforming, broaching or extrusion. Primary grooves 108 are formed on inner surface 104 at a helix angle α (not shown) to the axis s of the tube 100. Helix angle a may be any angle between 0° and 90°, but preferably does not exceed 70°. One skilled in the art will readily understand that the preferred helix angle a will often depend, at least in part, on the fluid medium used.

The axial pitch of the primary grooves 108 depends on many factors, including helix angle α, the number of primary grooves 108 formed on inner surface 104 of tube 100, and the inside diameter of tube 100. For purposes of this application, the inside diameter is measured from inner surface 104 of tube 100. An axial pitch of 0.01 inch to infinity (if the primary grooves 108 extend parallel to the tube axis s) is preferable.

Figure 15A:
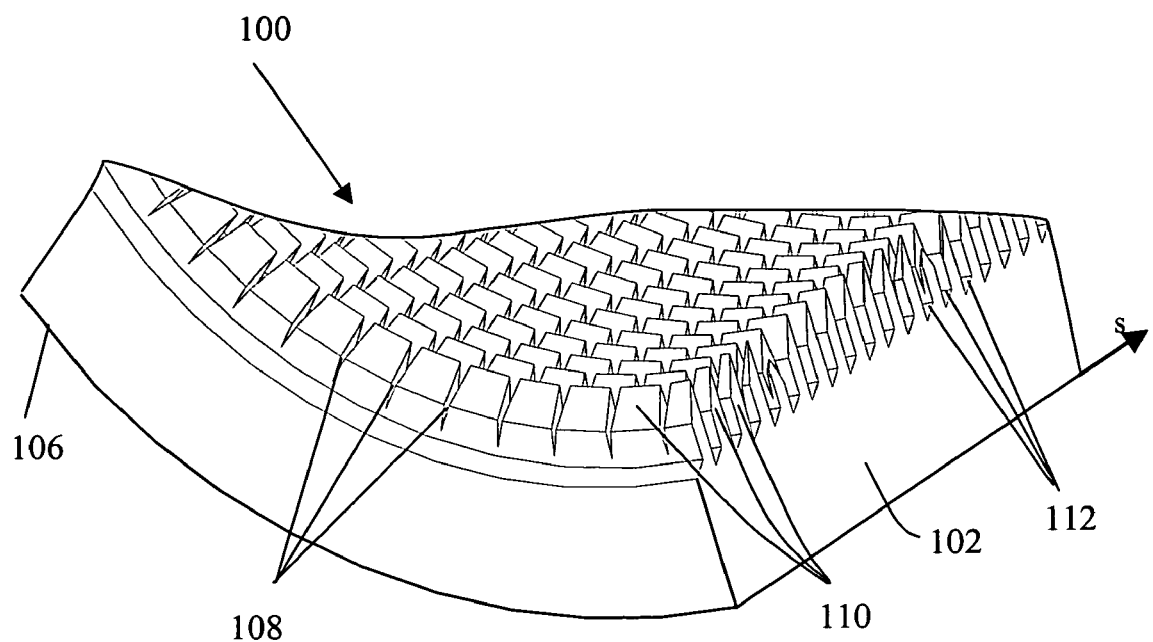
FIG. 15A is a fragmentary perspective view of the partially-formed boiling surface of the embodiment of FIG. 14.
Figure 15B:
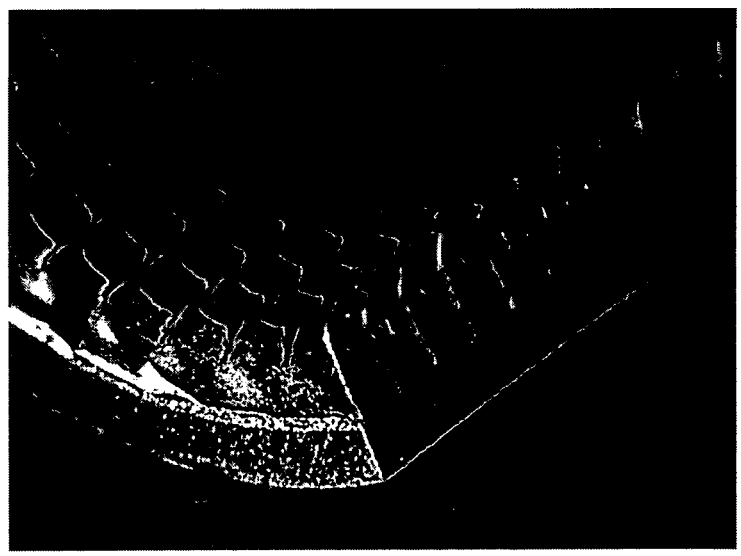
FIG. 15B is a photomicrograph of a perspective view of the partially-formed boiling surface of FIG. 15A.
Figure 15C:
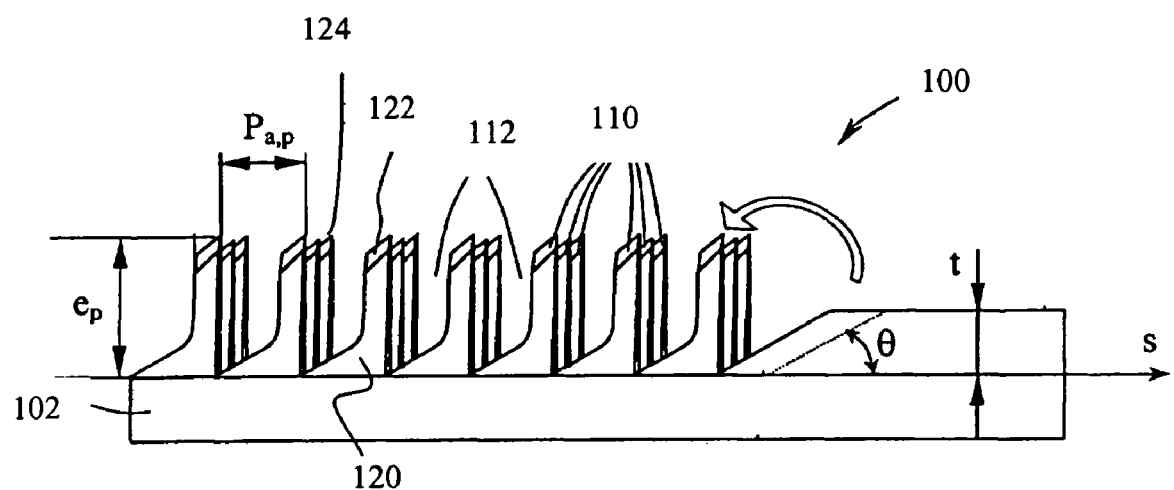
FIG. 15C is a cross-sectional view of the partially-formed boiling surface of FIG. 15A.
Figure 16A:
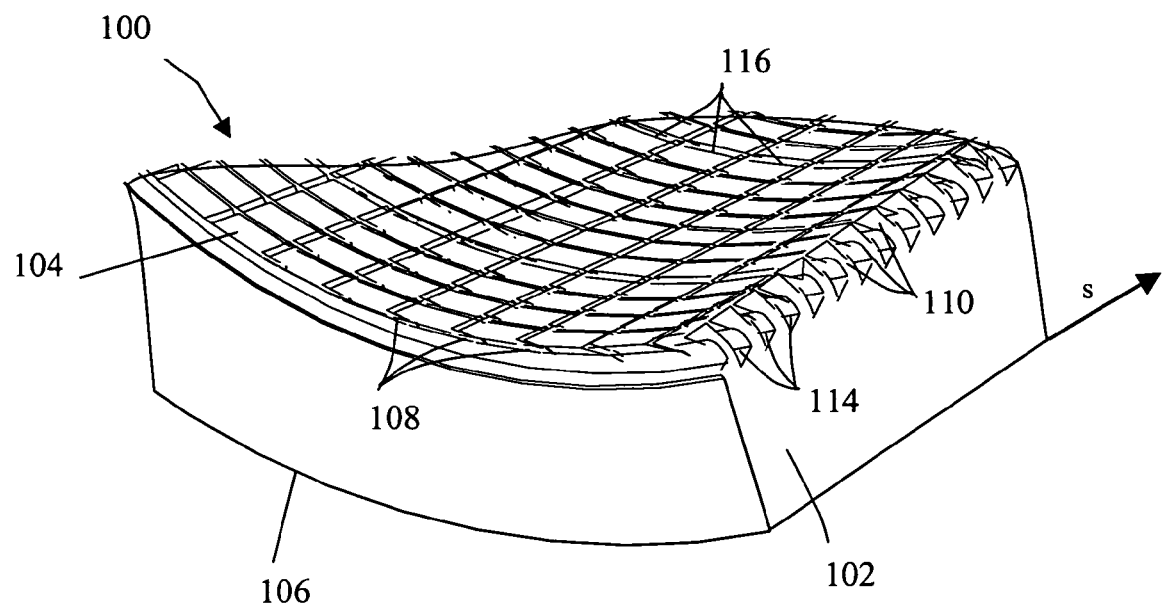
FIG. 16A is a fragmentary perspective view of a boiling surface on the inner diameter of a heat transfer tube according to an alternative embodiment of the invention.
Figure 16B:
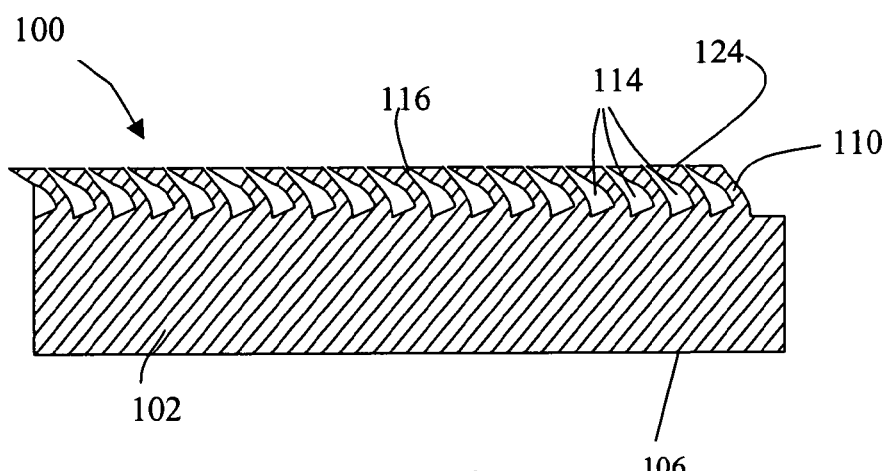
FIG. 16B is a cross-sectional view of the tube shown in FIG. 16A.
Figure 16C:
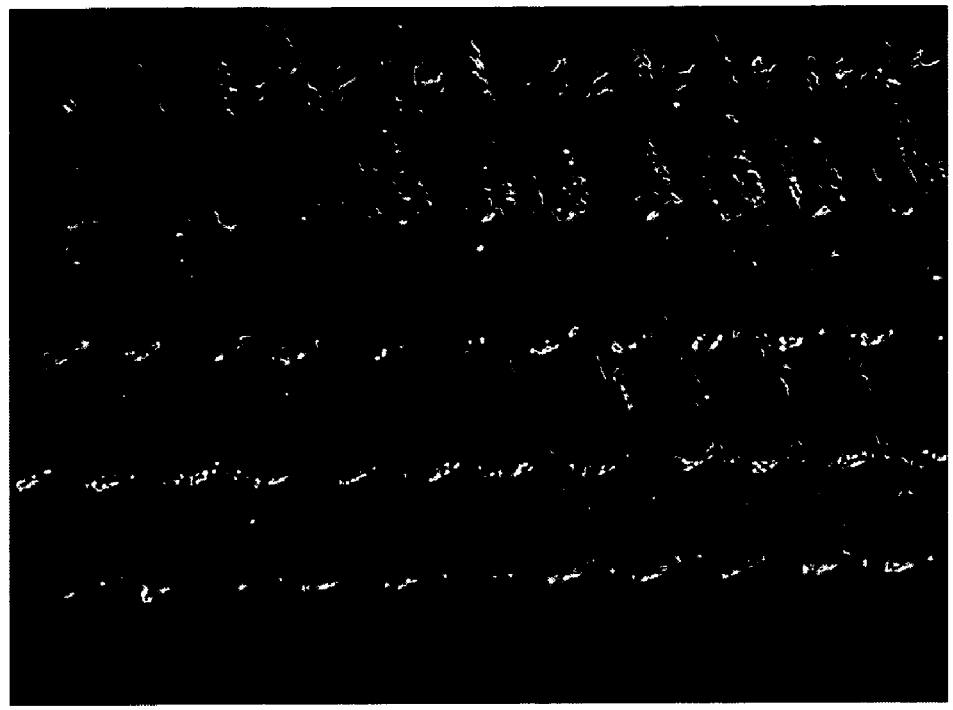
FIG. 16C is a photomicrograph of a top plan view the boiling surface of FIG. 16A.
Figure 16D:
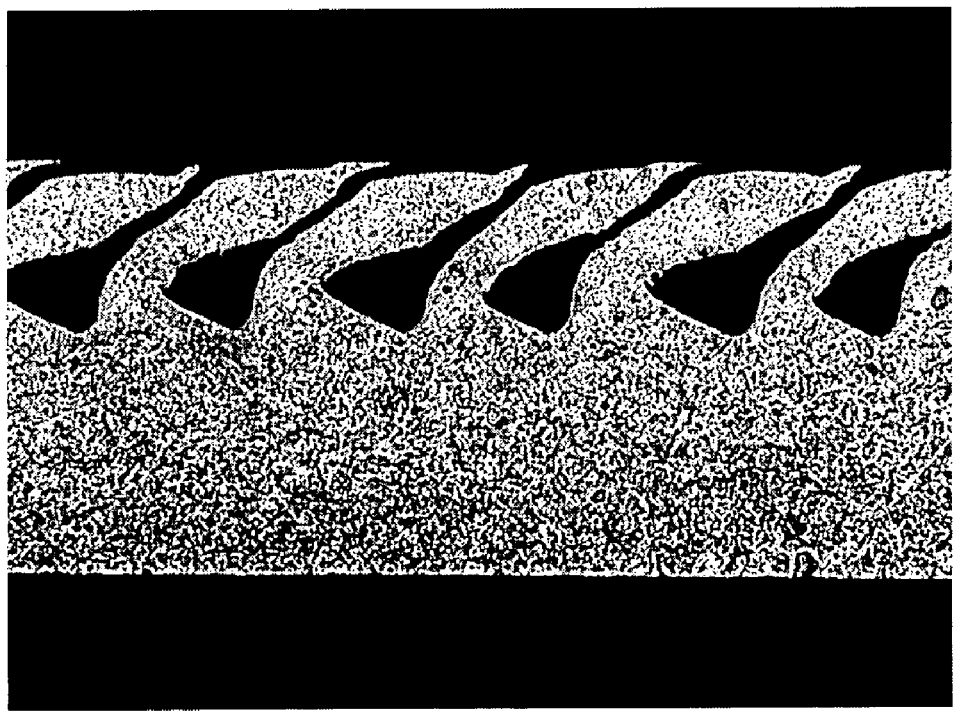
FIG. 16D is a photomicrograph of a cross-section of the boiling surface of FIG. 16A.

Certain embodiments of the invention also include protrusions or fins 110. Protrusions 110 may be cut and lifted from inner surface 104, as shown in FIGS. 15A-C. Protrusions 110 are preferably cut at an angle θ to axis s to tube 100 (see FIG. 15C). The height $e_p$ of protrusions 110 is dependent on the cutting depth t and angle θ at which inner surface 104 is cut. The height $e_p$ of protrusions 110 is always a value greater than the cutting depth t. Preferably, the cutting depth t is greater than the depth of primary grooves 108. However, the cutting depth t may be less than or equal to the depth of primary grooves 108 as well.

The axial pitch $P_{a,p}$ of protrusions 110 may be any value greater than zero and generally will depend on, among other factors, the relative revolutions per minute between the tool used to form the protrusions 110 (such as tool 13 discussed above or modified tools 300, 325, and 350, or retractable tool assembly 510, described below) and the tube 100 during manufacture, the relative axial feed rate between the tool used to form the protrusions 110 and the tube 100 during manufacture, and the number of cutting tips provided on the tool used to form the protrusions 110 during manufacture. Preferably, protrusions 110 have an axial pitch $P_{a,p}$ of between 0.00197-0.197 inches. The axial pitch $P_{a,p}$ and height will generally depend on the number of protrusions, which height $e_p$ decreases as $P_{a,p}$ decreases.

The shape of protrusions 110 is dependent on the shape of inner surface 104 and the orientation of inner surface 104 after primary grooves 108 have been cut relative to the direction of movement of the tool used to form the protrusions 110. In the embodiment of FIGS. 15A-C, protrusions 110 have four side surfaces 120, a sloped top surface 122, and a substantially pointed tip 124.

Figure 17A:
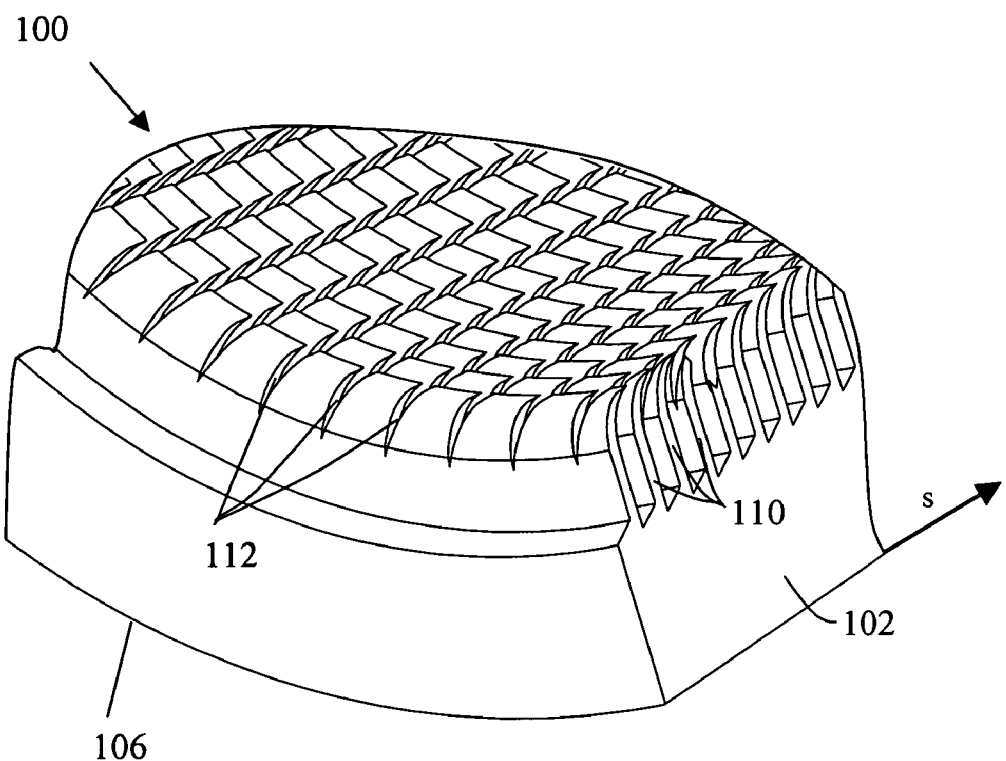
FIG. 17A is a fragmentary perspective view of a boiling surface on the inner diameter of a heat transfer tube according to an alternative embodiment of the invention.
Figure 17B:
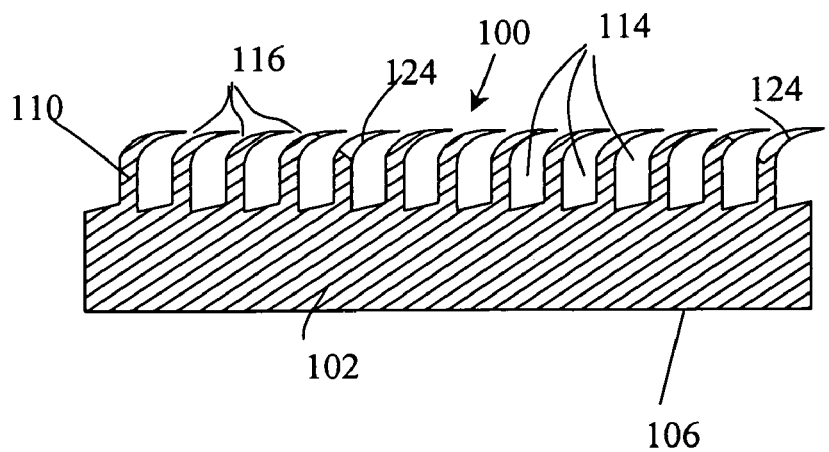
FIG. 17B is a cross-sectional view of the tube shown in FIG. 17A.
Figure 18A:
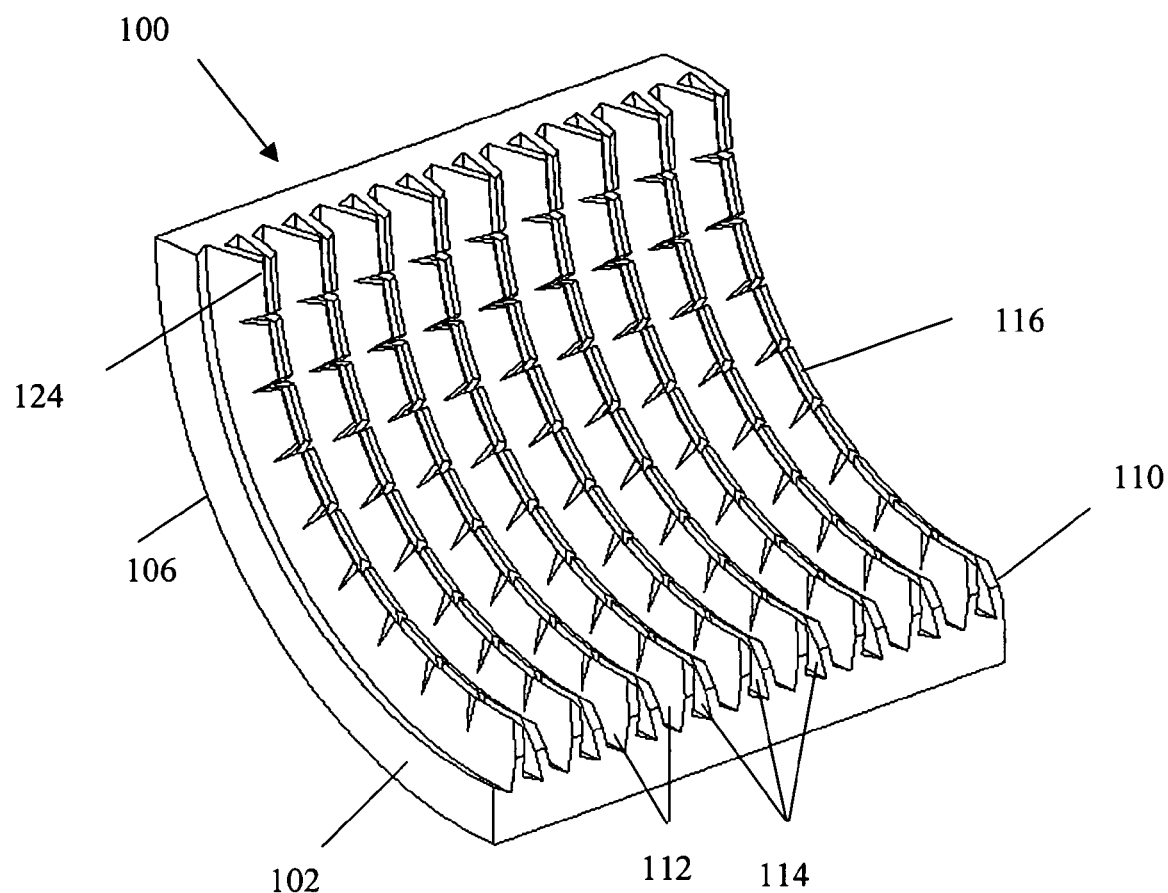
FIG. 18A is a fragmentary perspective view of a boiling surface on the inner diameter of a heat transfer tube according to an alternative embodiment of the invention.
Figure 18B:
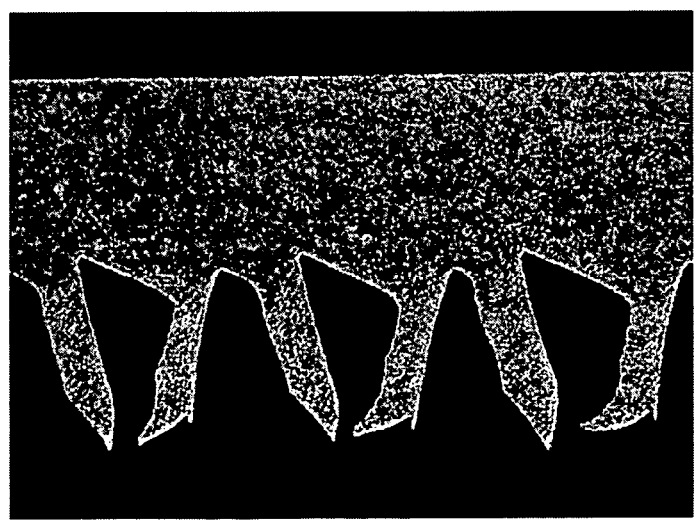
FIG. 18B is a photomicrograph of a cross-section of the boiling surface of FIG. 18A.
Figure 18C:
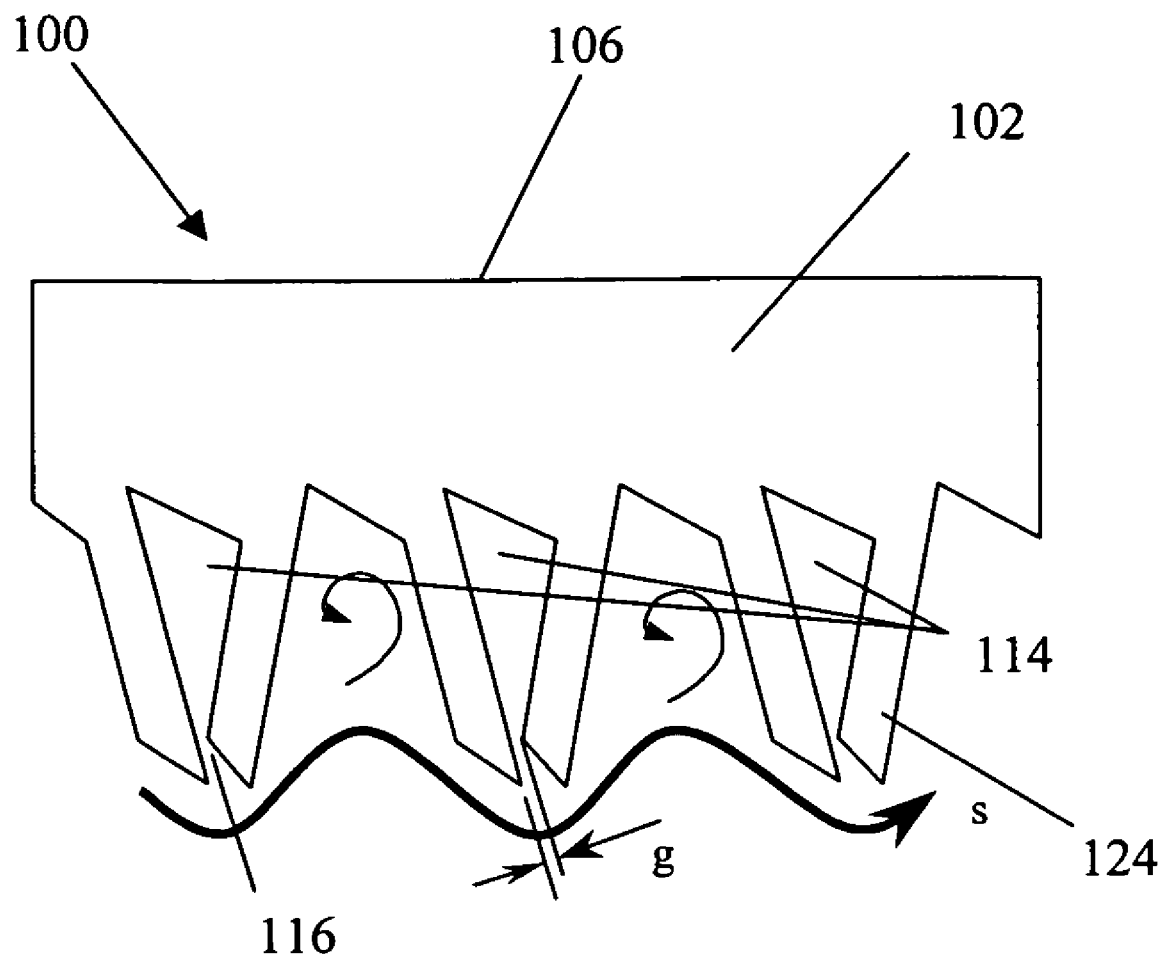
FIG. 18C is a cross-sectional view of the boiling surface of FIG. 18A.
Figure 23A:
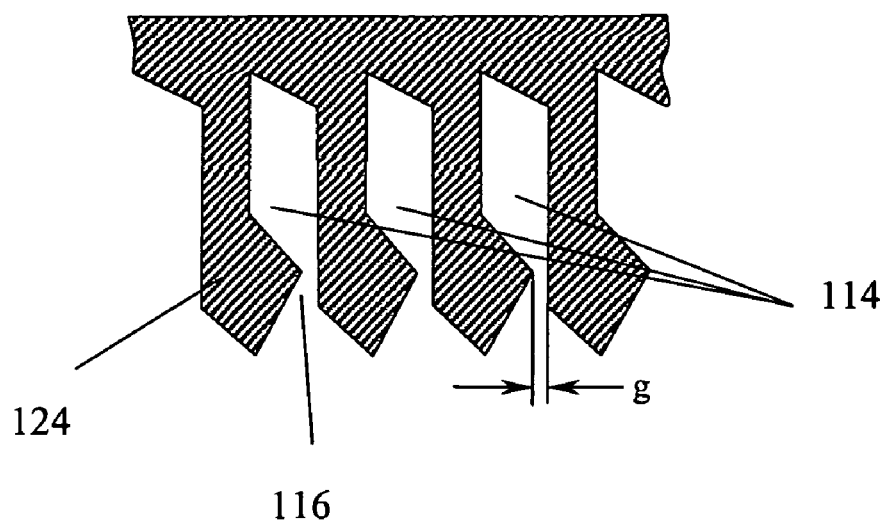
FIG. 23A is a cross-sectional view of a boiling surface on the inner diameter of a heat transfer tube in accordance with an alternative embodiment of the invention.
Figure 23B:
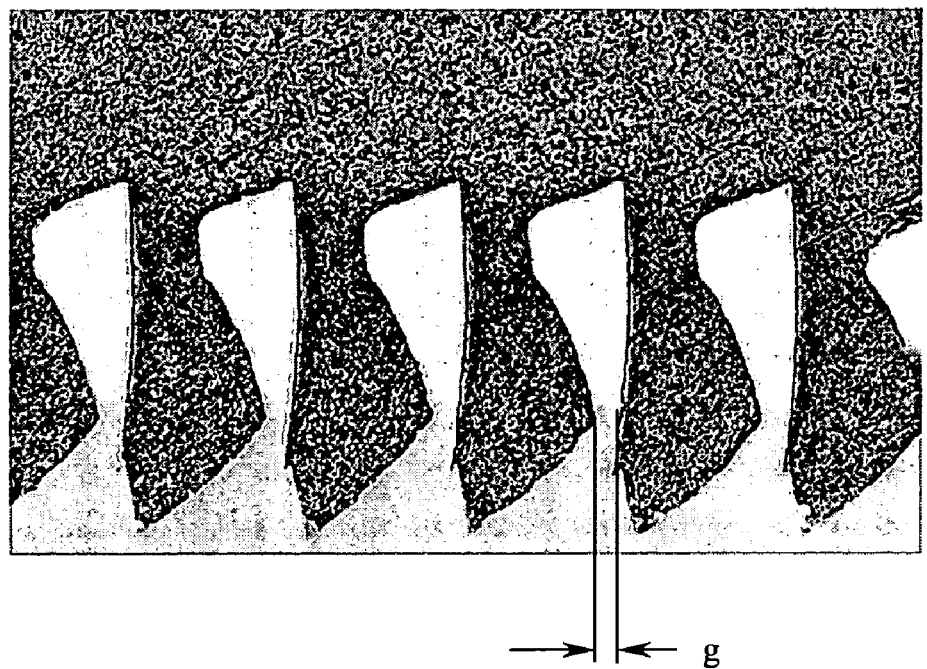
FIG. 23B is a photomicrograph of the boiling surface of FIG. 23A.

The tips 124 of protrusions 110 optionally may be flattened to create boiling cavities 114, as shown in FIGS. 16A-D. Alternatively, the tips 124 of protrusions 110 may be bent to create boiling cavities 114, as shown in FIGS. 17A-B. In other embodiments, the tips 124 of protrusions 110 may be thickened to create boiling cavities 114, as shown in FIGS. 23A-B. In still other embodiments, the protrusions 110 may be angled toward each other, such as shown in FIGS. 18A-C, to create boiling cavities 114. One with skill in the art will understand that the tips 124 of protrusions 110 may remain substantially straight (not bent or flattened) and substantially perpendicular to the inner surface 104 of the tube 100 if a condensing surface is desired. However, if a boiling or evaporation surface is desired, the creation of boiling cavities 114 may substantially increase the efficacy of the boiling surface. The creation of boiling cavities 114 creates a path for fluid flow and increases the transition from liquid to vapor.

The protrusions 110 of this invention are in no way intended to be limited to the illustrated embodiment, however, but rather can be formed in any shape. Moreover, protrusions 110 in tube 100 need not be the same shape or have the same geometry.

As shown in FIG. 15A, secondary grooves 112 may be located between adjacent protrusions 110. Secondary grooves 112 are oriented at an angle τ (not shown) to the axis s of tube 100. Angle τ may be any angle between approximately 80° and 100°. Preferably, angle τ is approximately 90°.

Figure 19:
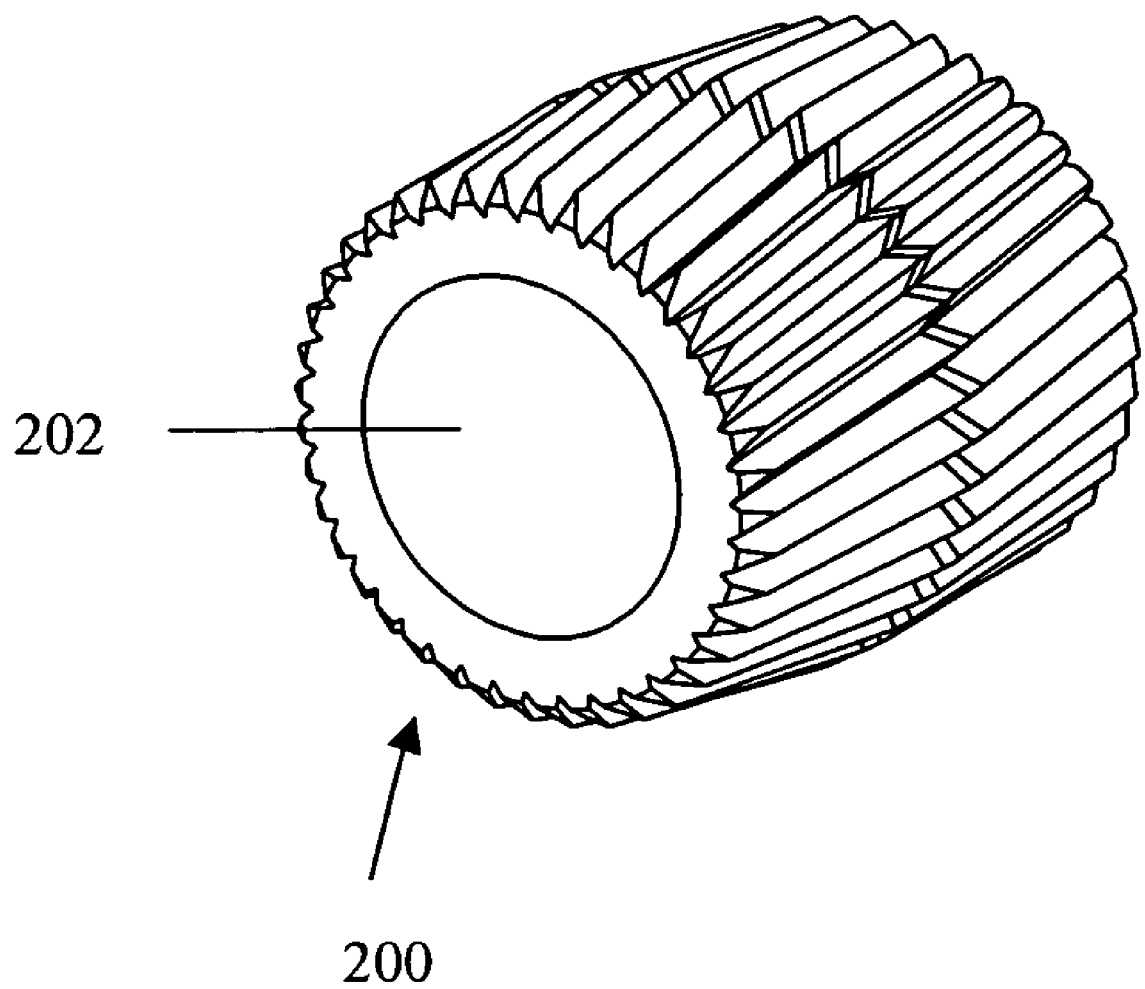
FIG. 19 is a perspective view of a grooving tool.

Certain embodiments of the invention also include methods and tools for making boiling surfaces on a tube. A grooving tool 200, such as that shown in FIG. 19, is particularly useful in forming primary grooves 108. Grooving tool 200 has an outer diameter greater than inner diameter of tube 100 so that when pulled or pushed through tube 100, primary grooves 108 are formed. Grooving tool 200 also includes an aperture 202 for attaching to a shaft 130 (shown in FIG. 21).

Tool 13, shown in FIGS. 6A-D and FIGS. 7A-D, may be used as described above to form protrusions 110 and secondary grooves 112. While preferred ranges of values for the physical dimensions of protrusions 110 have been identified, one skilled in the art will recognize that the physical dimensions of tool 13 may be modified to impact the physical dimensions of resulting protrusions 110. For example, the depth t that cutting edge 14 cuts into inner surface 104 and angle φ affect the height $e_p$ of protrusions 110. Therefore, the height $e_p$ of protrusions 110 may be adjusted using the expression:

$$e_p = t/\sin(90-\phi)$$

or, given that φ=90−θ, $$e_p = t/\sin(\theta)$$

Where:
t is the cutting depth;
φ is the angle between plane B and a plane perpendicular to tool axis q; and
θ is the angle at which the layers are cut relative to the longitudinal axis s of the tube 100.

Thickness $S_p$ of protrusions 110 depends on pitch $P_{a,p}$ of protrusions 110 and angle φ. Therefore, thickness $S_p$ can be adjusted using the expression:

$$S_p = P_{a,p} \cdot \sin(90-\phi)$$

or, given that φ=90−θ, $$S_p = P_{a,p} \cdot \sin(\theta)$$

Where:
$P_{a,p}$ is the axial pitch of protrusions 110;
φ is the angle between plane B and a plane perpendicular to tool axis q; and
θ is the angle at which inner surface 104 is cut relative to the longitudinal axis s of the tube 100.

Figure 22:
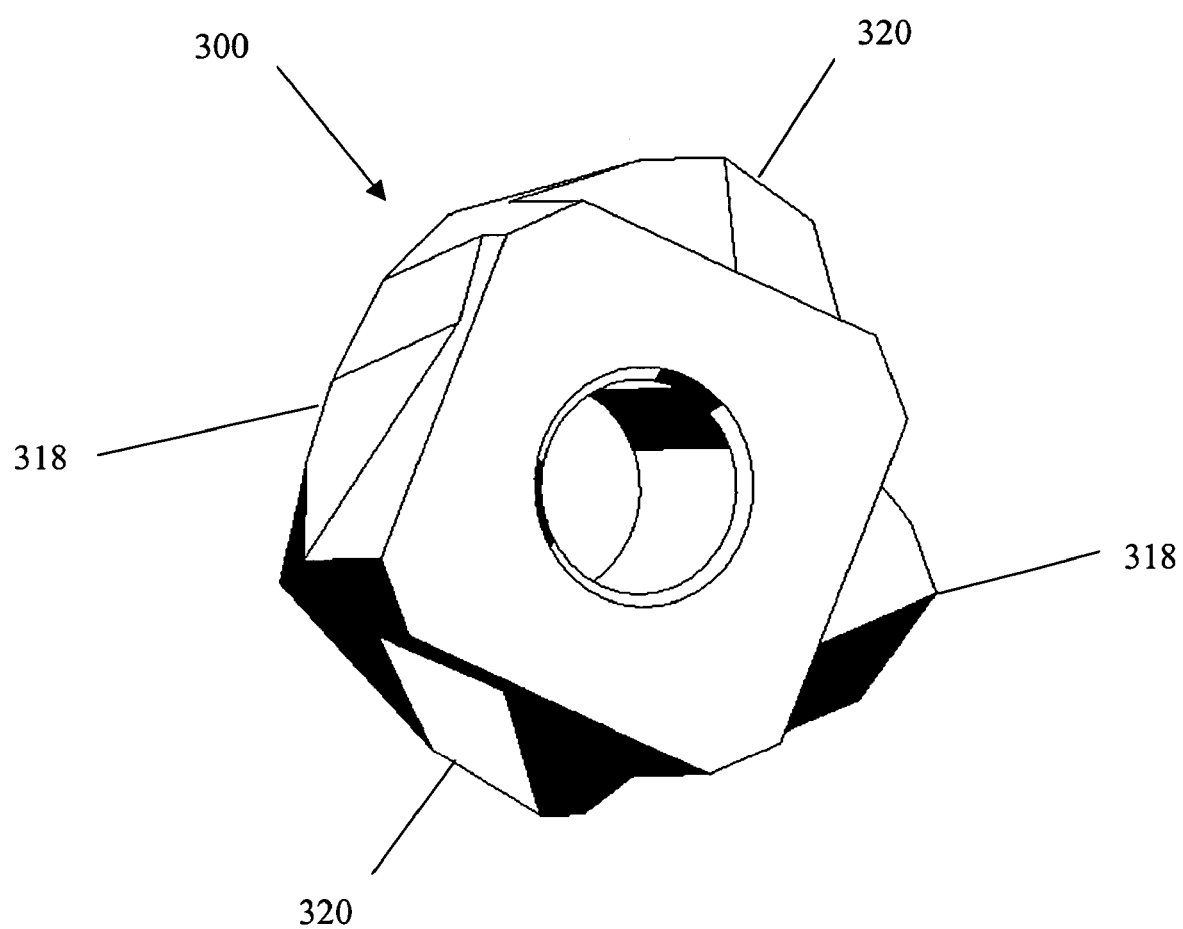
FIG. 22 is perspective view of a tool according to another embodiment of the invention.

Alternatively, tool 13 may be modified to create a variety of different surfaces. As explained above, the geometry of the tips on a single tool 13 need not be the same. For example, FIG. 22 illustrates a modified tool 300 with two pairs of tips 318, 320 having different geometries to create a boiling surface with inclined protrusions 110, such as is shown in FIGS. 18A-C. To create such a surface, the neighboring tips 318, 320 are formed with different angles $\phi_1$ (which determines the angle of inclination ω at which protrusions 110 are lifted). Changing the inclination angle ω of the protrusions 110 is possible to obtain a particular gap g between protrusions 120 at the opening 116 of the boiling cavity 114, which affects the curved fluid flow s along the surface 104.

Thus, the gap g obtained may be calculated as follows:

$$g = p \cdot (1 - \sin(\varphi)) - tg(90 - \varphi_1) \cdot \left[ \frac{2t \cdot \sin(\varphi_1)}{\sin\varphi} - p \cdot \sin(\varphi) \cdot (1 - \sin(\varphi)) \right]$$

Where:
p is the axial pitch of the protrusions 110;
φ is the angle between plane B and a plane perpendicular to tool axis q;
$\phi_1$ is the angle of the tool 300 between plane C and a plane perpendicular to tool axis q; and
t is the depth of cutting.

Figure 21:
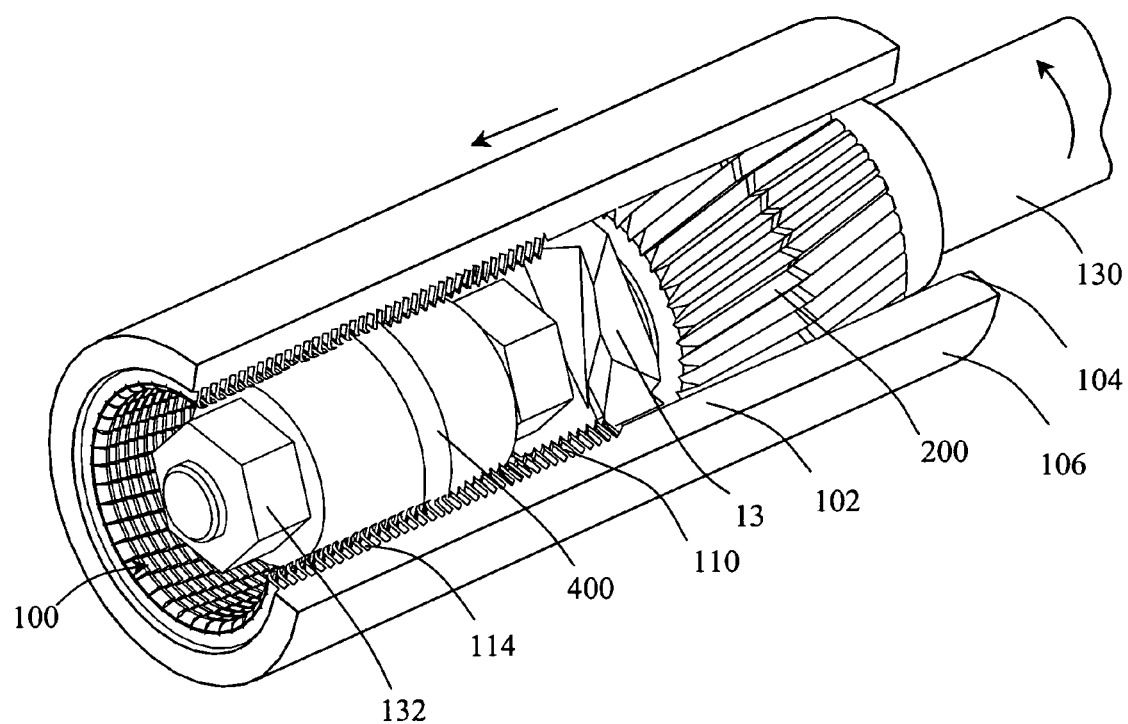
FIG. 21 is a perspective view of an embodiment of the manufacturing equipment than can be used to produce heat transfer tubes in accordance with this invention.

In certain embodiments of the invention, the tips 124 of protrusions 110 may be flattened or bent (such as shown in FIGS. 16A-D) using flattening tool 400, shown in FIG. 21. The flattening tool 400 preferably has a diameter greater than the diameter of protrusions 110 on inner surface 104. Thus, when flattening tool 400 is pushed or pulled through tube 100, the tips 124 of protrusions 110 are bent or flattened. Flattening tool 400 includes an aperture 402 for attaching to shaft 130.

Figure 20A:
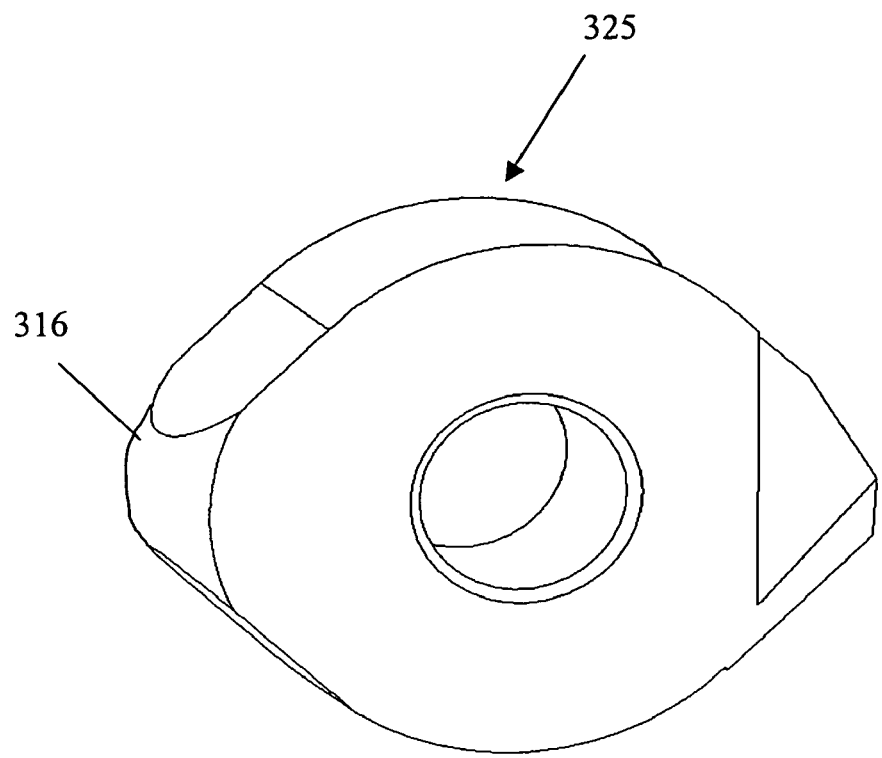
FIG. 20A is perspective view of a tool according to another embodiment of the invention.
Figure 20B:
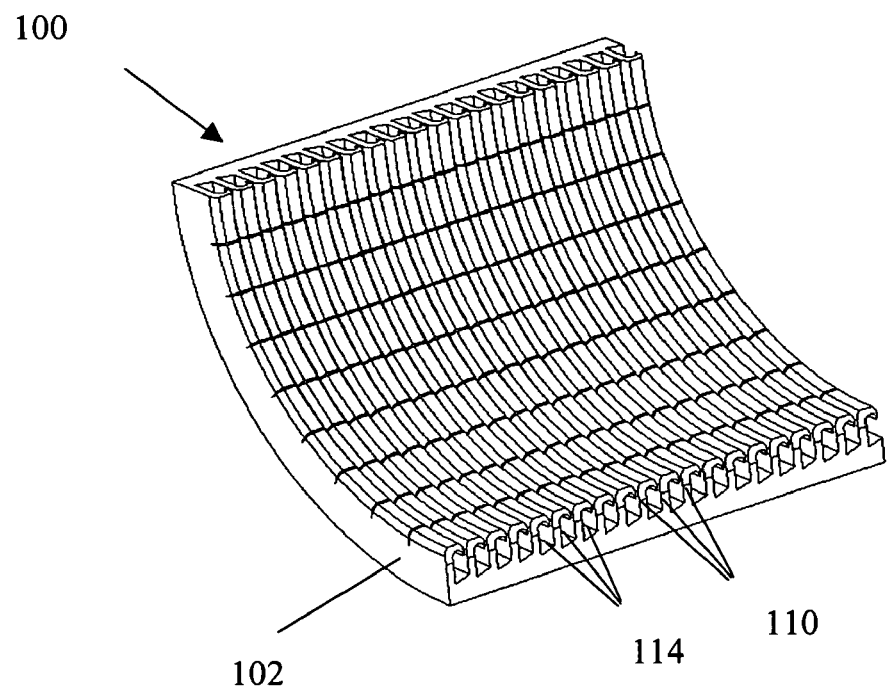
FIG. 20B is a perspective view of a boiling surface formed by the tool of FIG. 20A.
Figure 20C:
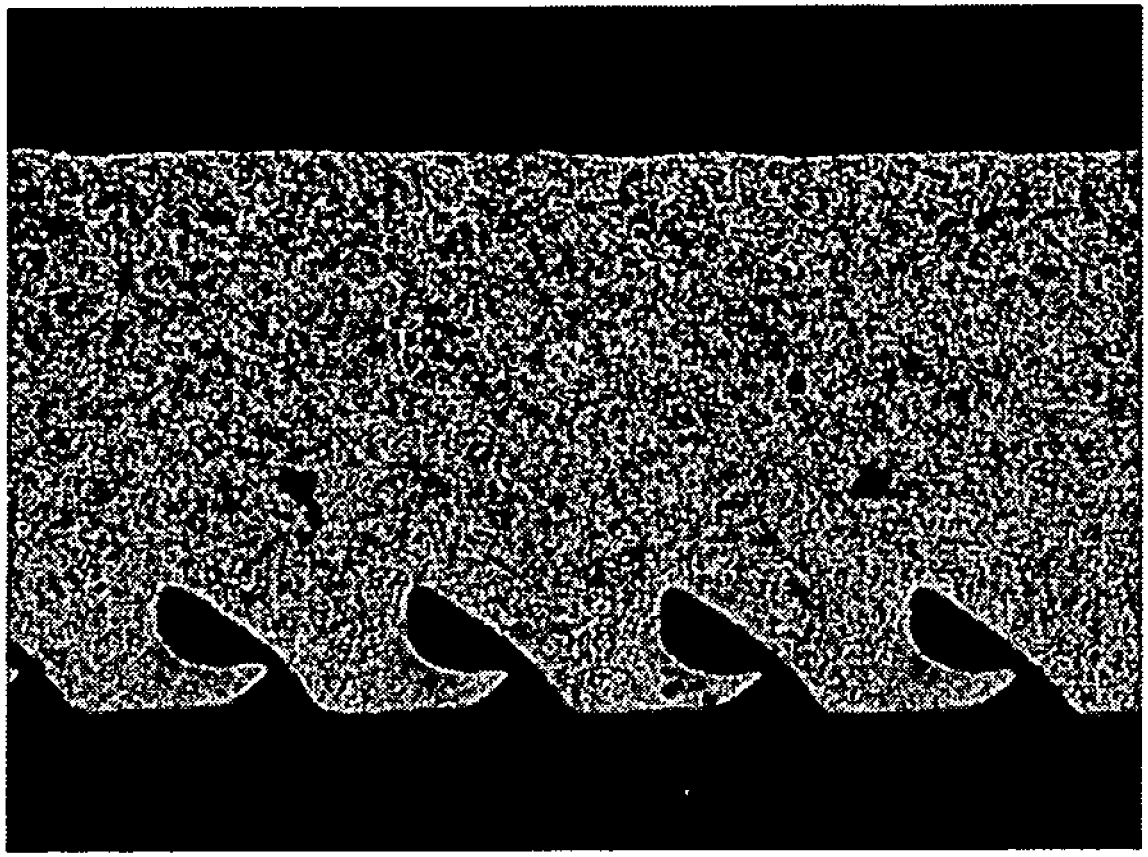
FIG. 20C is a photomicrograph of the boiling surface of FIG. 20B.

In other embodiments, the tips 124 of protrusions 110 may achieve a shape similar to the flattened or bent tips 124 shown in FIGS. 16A-D without the use of a flattening tool 400. For example, tool 13 may be modified to incorporate, in addition to tips 12 that cut and lift protrusions, a tip or tips for flattening the tips 124 of protrusions 110. For example, modified tool 325, which is shown in FIG. 20A and which can otherwise have the same geometry as tool 13, includes a flattening tip 316 which bends or flattens the protrusions after formation. Modified tool 325 may be used to create a boiling surface such as that shown in FIGS. 17A-B and 20B-C.

Boiling surfaces for use on heat transfer surfaces may also be achieved by creating protrusions 110 with thickened tips 124. As shown in FIGS. 23A-B, heat transfer surfaces with thickened tips 124 can be used to create boiling cavities 114. FIGS. 24C-D illustrate a modified embodiment 350 of tool 13 that may be used to create protrusions 110 with thickened tips 124.

Figure 6A:
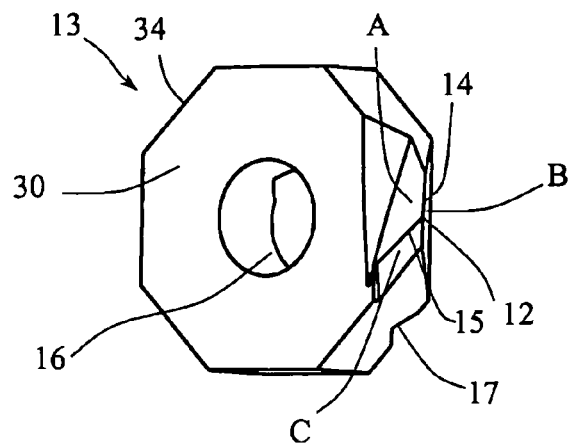
FIG. 6a is a perspective view of one embodiment of the tool of this invention.
Figure 6B:
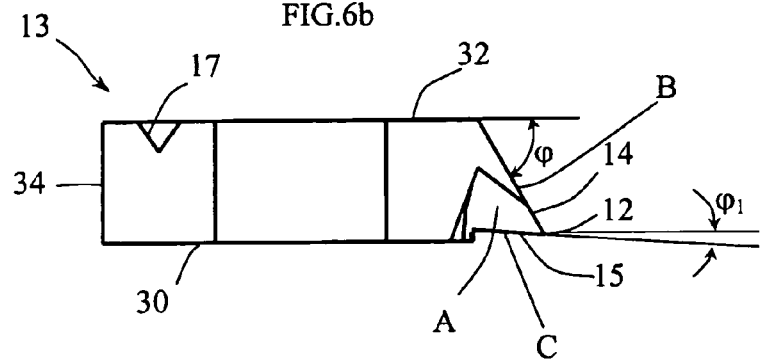
Figure 6C:
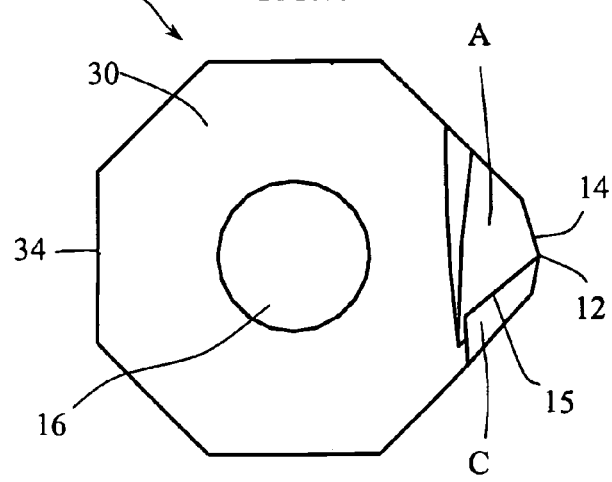
FIG. 6c is a bottom plan view of the tool of FIG. 6b.
Figure 6D:
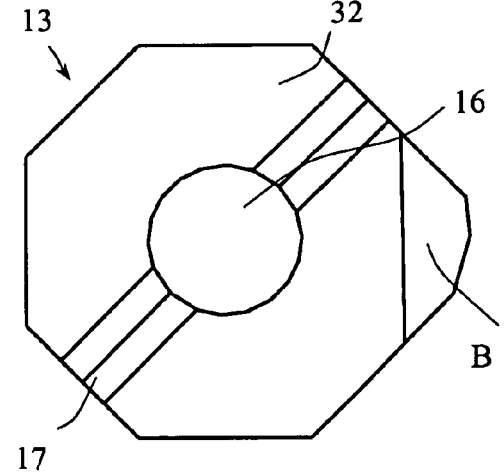
FIG. 6d is a top plan view of the tool of FIG. 6b.

In these embodiments, the tips 302 of modified tool 350 include two cutting edges 360, 370, a first cutting edge 360 oriented at an angle $\beta_2$ relative to a plane perpendicular to the tool axis q and a second cutting edge 370 oriented at an angle $\beta_3$ relative to a plane perpendicular to the tool axis q (angles $\beta_2$ and $\beta_3$ are analogous to angle $\phi$ shown in FIG. 6b). Adjusting angles $\beta_2$ and $\beta_3$ adjusts the angle $\theta$ at which the ridges 1 or tube surface 104 are cut and thus the resulting shape of the protrusion. By cutting into a ridge 1 or tube surface 104 at two angles, protrusions with a thinner shaft and thicker tip, as shown in FIGS. 23A-B and 24A-B, can be formed.

Figure 24A:
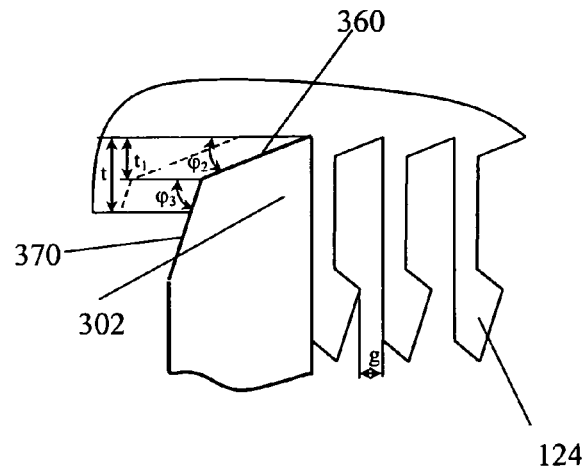
FIG. 24A is a cross-sectional view of a boiling surface as it is formed with a tool in accordance with an embodiment of the invention.
Figure 24B:
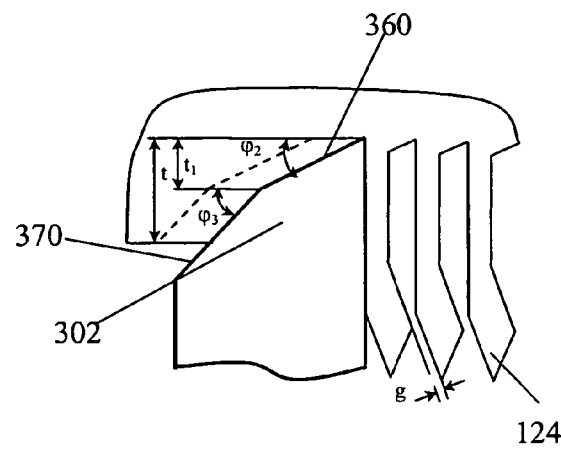
FIG. 24B is a cross-sectional view of a boiling surface as it is formed with a tool in accordance with an alternative embodiment of the invention.
Figure 24C:
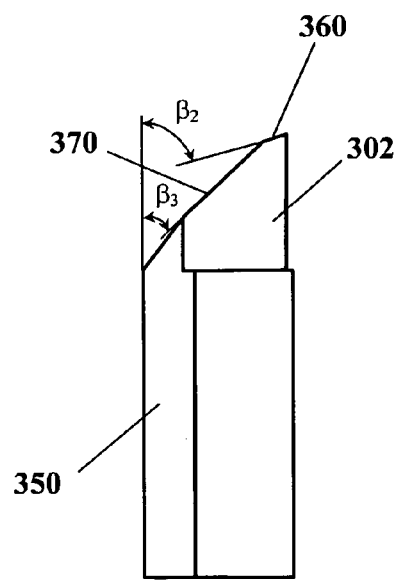
FIG. 24C is a perspective view of a tool tip according to an embodiment of the invention that may be used to form the boiling surfaces of FIGS. 24A and 24B.
Figure 24D:
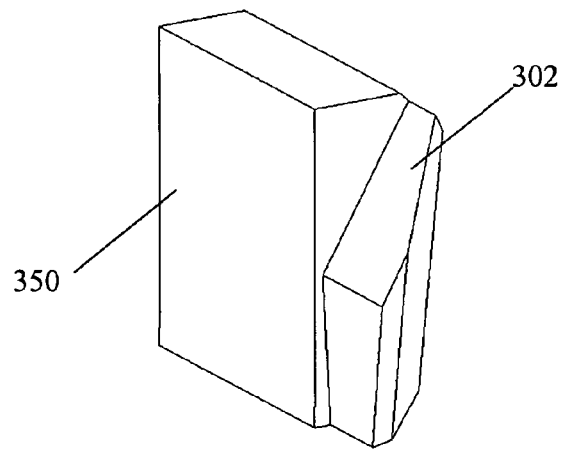
FIG. 24D is an alternative perspective view of the tool tip shown in FIG. 24C.

Protrusions 110 with thickened tips 124 can be obtained using the following formulas, with reference to FIGS. 24A-B:
Where:

$$\frac{p}{t-t_1} \geq \frac{\sin(\varphi_3 - \varphi_2) \cdot \sin\varphi_3}{\cos\varphi_2}$$

$\phi_2$ is the angle between projection of the first site of a cutting edge and direction of tool feed ($\phi_2 = 90°\beta_2$);
$\phi_3$ is the angle between projection of the second site of a cutting edge and direction of tool feed ($\phi_3 = 90° - \beta_3$);
t is the full depth of cutting; and
$t_1$ is the depth of cutting for the first site of cutting edge, then the protrusion tips 124 will be as shown in FIG. 24A and, the gap g may be calculated as follows:

$$g = p \cdot (1 - \sin(\varphi_2)) - \frac{(t - t_1) \cdot \sin(\varphi_3 - \varphi_2)}{\sin(\varphi_3)}$$

If the following is true:

$$\frac{p}{t-t_1} \leq \frac{\sin(\varphi_3 - \varphi_2) \cdot \sin\varphi_3}{\cos\varphi_2}$$

then the protrusion tips 124 will be as shown in FIG. 24B and the gap g may be calculated as follows:

$$g = p \cdot \cos(\phi_3 - \phi_2) \cdot (1 - \sin((\phi_2) - \cos(\phi_2) \cdot (tg(\phi_3 - \phi_2)))$$

FIG. 21 illustrates one possible manufacturing set-up for enhancing the surfaces of tube 100. These figures are in no way intended to limit the process by which tubes 100 in accordance with this invention are manufactured, but rather any tube manufacturing process using any suitable equipment or configuration of equipment may be used. The tubes 100 of this invention may be made from a variety of materials possessing suitable physical properties including structural integrity, malleability and plasticity, such as, for example, copper and copper alloys, aluminum and aluminum alloys, brass, titanium, steel and stainless steel.

In one example of a way to enhance inner surface 104 of tube 100, a shaft 130, onto which flattening tool 400 is mounted through aperture 402, extends into tube 100. Tool 13 is mounted onto shaft 130 through aperture 16. One of skill in the art will understand that modified tools 300, 325, or 350 may be substituted for tool 13 and/or flattening tool 400 removed, depending on the surface desired to be formed. Grooving tool 200 is rotatably mounted onto shaft 130 through aperture 202. Bolt 132 secures all three tools 200, 13, 400 on the shaft 130. The tools 13 and 400 are preferably locked in rotation with shaft 130 by any suitable means. FIGS. 6B and 7B illustrate a key groove 17 that may be provided on tool 13 to interlock with a protrusion on the shaft (not shown) to fix tool 13 into place relative to shaft 130.

Although not shown, when the method and/or tool of the invention is used to create an inner surface of a tube, the manufacturing set-up may include arbors that can be used to enhance the outer surface of tube, as discussed above and shown in FIG. 5. Each arbor 10 generally includes a tool set-up having finning disks 7 which radially extrude from one to multiple start outside fins having axial pitch $P_{a,o}$. The tool set-up may include additional disks, such as notching or flattening disks, to further enhance the outer surface of tube. Note, however, that depending on the tube application, enhancements need not be provided on outer surface of tube at all. In operation, tube wall moves between mandrel and the arbors, which exert pressure on tube wall.

The mirror image of a desired inner surface pattern is provided on grooving tool 200 so that grooving tool 200 will form inner surface 104 of tube 100 with the desired pattern as tube 100 engages grooving tool 200. A desirable inner surface 104 includes primary grooves 108, as shown in FIG. 14. After formation of primary grooves 108 on inner surface 104 of tube 100, tube 100 encounters tool 13, positioned adjacent and downstream grooving tool 200. The cutting edge(s) 14 of tool 13 cuts through inner surface 104. Lifting edge(s) 15 of tool 13 then lifts inner surface 104 to form protrusions 1 10.

When protrusions 110 are formed simultaneously with outside finning and tool 13 is fixed (i.e., not rotating or moving axially), tube 100 automatically rotates and has an axial movement. In this instance, the axial pitch of protrusions 110 $P_{a,p}$ is governed by the following formula:

$$P_{a,p} = \frac{P_{a,o} \cdot Z_o}{Z_i}$$

Where:

$P_{a,o}$ is the axial pitch of outside fins;

$Z_o$ is the number of fin starts on the outer diameter of tube; and $Z_i$ is the number of tips 12 on tool 13.

To obtain a specific protrusion axial pitch $P_{a,p}$, tool 13 can also be rotated. Both tube 100 and tool 13 can rotate in the same direction or, alternatively, both tube 100 and tool 13 can rotate, but in opposite directions. To obtain a predetermined axial protrusion pitch $P_{a,p}$, the necessary rotation (in revolutions per minute (RPM)) of the tool 13 can be calculated using the following formula:

$$RPM_{tool} = \frac{RPM_{tube}(P_{a,o} \cdot Z_o - P_{a,p} \cdot Z_i)}{Z_i \cdot P_{a,p}}$$

Where:

$RPM_{tube}$ is the frequency of rotation of tube 100;

$P_{a,o}$ is the axial pitch of outer fins;

$Z_o$ is the number of fin starts on the outer diameter of tube;

$P_{a,p}$ is the desirable axial pitch of protrusions 110; and $Z_i$ is the number of tips 12 on tool 13.

If the result of this calculation is negative, then tool 13 should rotate in the same direction of tube 100 to obtain the desired pitch $P_{a,p}$. Alternatively, if the result of this calculation is positive, then tool 13 should rotate in the opposite direction of tube 100 to obtain the desired pitch $P_{a,p}$.

Note that while formation of protrusions 110 is shown in the same operation as formation of primary grooves 108, protrusions 110 may be produced in a separate operation from primary grooves 108 by using a tube 100 with pre-formed primary grooves 108. This would generally require an assembly to rotate tool 13 or tube 100 and to move tool 13 or tube 100 along the tube axis. Moreover, a support (not shown) is preferably provided to center tool 13 relative to the inner tube surface 104.

In this case, the axial pitch $P_{a,p}$ of protrusions 110 is governed by the following formula:

$$P_{a,p} = X_a/(RPM \cdot Z_i)$$

Where:

$X_a$ is the relative axial speed between tube 100 and tool 13 (distance/time);

RMP is the relative frequency of rotation between tool 13 and tube 100;

$P_{a,p}$ is the desirable axial pitch of protrusions 1 10; and $Z_i$ is the number of tips 12 on tool 13.

This formula is suitable when (1) the tube 100 moves only axially (i.e., does not rotate) and the tool 13 only rotates (i.e., does not move axially); (2) the tube 100 only rotates and the tool 13 moves only axially; (3) the tool 13 rotates and moves axially but the tube 100 is both rotationally and axially fixed; (4) the tube 100 rotates and moves axially but the tool 13 is both rotationally and axially fixed; and (5) any combination of the above.

With the inner tube surface 104 of this invention, additional paths for fluid flow are created through secondary grooves 112 to optimize heat transfer and pressure drop. FIG. 15A illustrates these additional paths for fluid travel through tube 100. These paths are in addition to the fluid flow paths created between primary grooves 108. These additional paths have a helix angle $\alpha_1$ relative to the tube axis s. Angle $\alpha_1$ is the angle between protrusions 110 formed from adjacent primary grooves 108. Helix angle $\alpha_1$, and thus orientation of these additional paths through tube 100, can be adjusted by adjusting pitch $P_{a,p}$ of protrusions 110 using the following expression $$P_{a,p} = \frac{P_{a,r} \cdot \tan(\alpha) \cdot \pi D_i}{\pi D_i \cdot (\tan(\alpha) + \tan(\alpha_1)) \pm P_{a,r} \cdot \tan(\alpha) \cdot \tan(\alpha_1) \cdot Z_i}$$

Where:

$P_{a,r}$ is the axial pitch of primary grooves 108;

$\alpha$ is the angle of primary grooves 108 to tube axis s;

$\alpha_1$ is the desirable helix angle between protrusions 110;

$Z_i$ is the number of tips 12 on tool 13; and $D_i$ is the inside diameter of tube 100 measured from inner surface 104 of tube 100.

FIGS. 25-34 illustrate another tool assembly 510 that can be used to form the heat transfer surfaces described above. Tool assembly includes a rod 512 having a tip 514 (see FIG. 27) for forming protrusions on the surface (and particularly the inner surface) of a heat transfer tube. The rod 512 may be of any material having the structural integrity to withstand metal cutting (e.g., steel, carbide, ceramic, etc.), but is preferably made of a carbide (such as tungsten carbide). The tip 514 is preferably, but does not have to be, formed integrally on an end of the rod 512. The geometry of the tip 514 is preferably, but does not have to be, the same as the tips 12 of tool 13, as shown in, and described above with respect to, FIGS. 6a-d.

Figure 30:
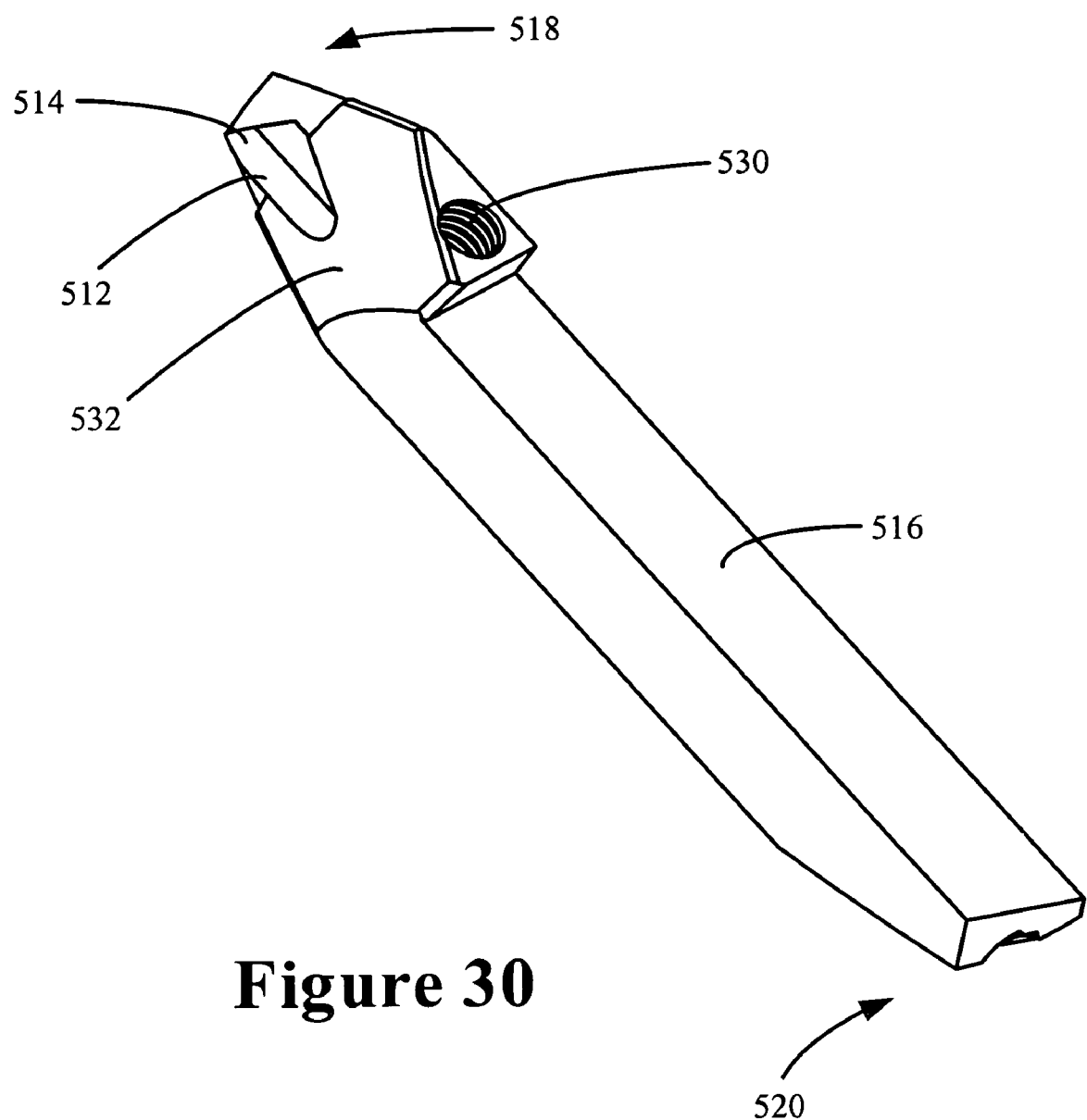
FIG. 30 is a perspective view of the rod of FIG. 27 positioned in the rod guide of FIGS. 28 and 29.
Figure 31:
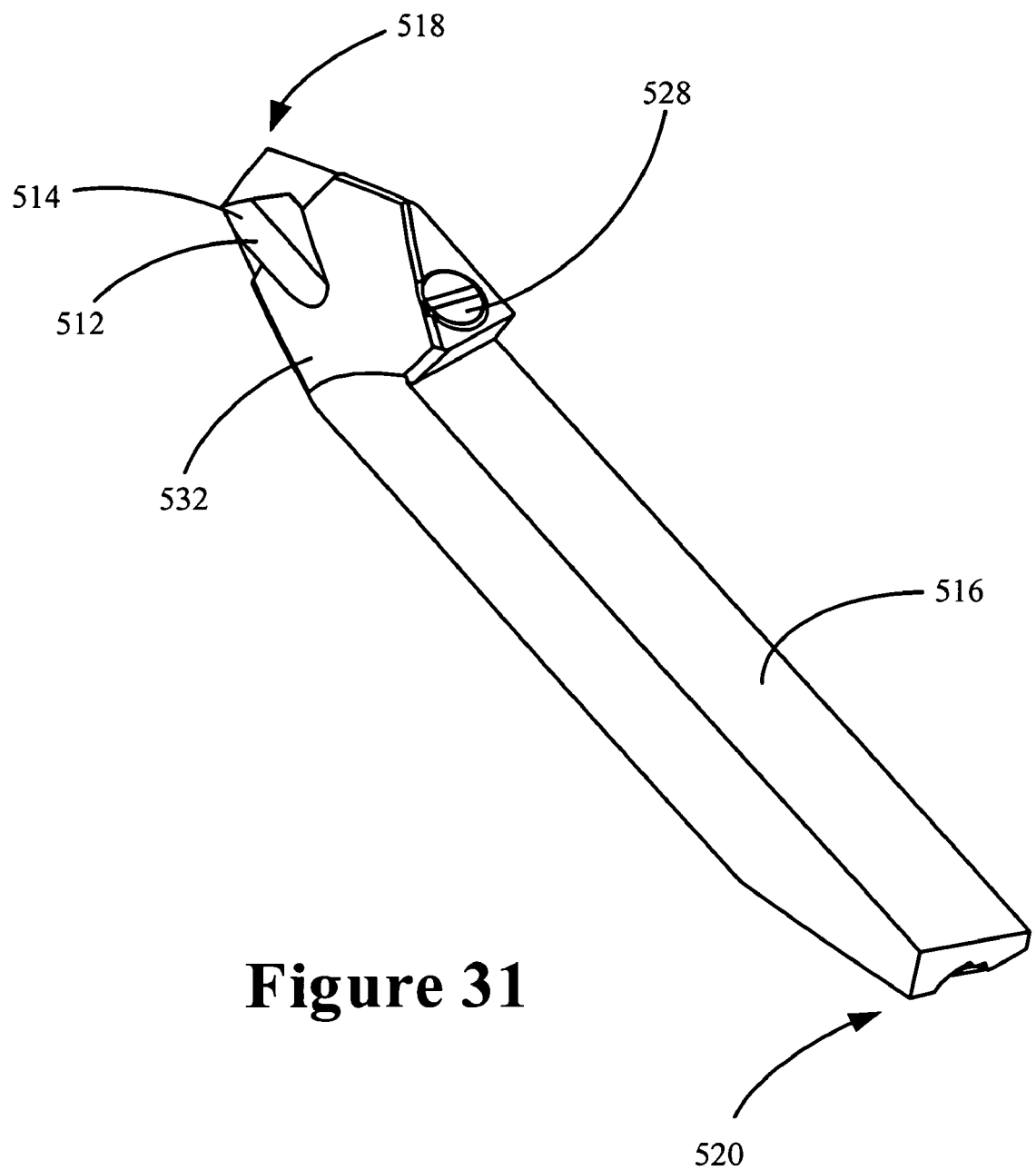
FIG. 31 is a perspective view of the rod of FIG. 27 positioned and secured in the rod guide of FIGS. 28 and 29 with a screw.

The rod 512 is slid into a rod guide 516 (shown in FIGS. 28-29) having a head end 518 and a tail end 520 and provided with a shaft 522 dimensioned to receive the rod 512 (see FIGS. 30-31). The shaft 522 preferably extends through the rod guide 516 so as to have an opening at or proximal to both the head end 518 and the tail end 520 of the rod guide 516. The tip 514 extends from the shaft 522 opening at the head end 518 of the rod guide 516. After the rod 512 is slid into the rod guide 516, a screw 524 (best seen in FIGS. 25-26) may be engaged in the shaft 522 opening at the tail end 520 of the rod guide 516. Adjustment of the screw 524 adjusts the amount that the tip 514 extends from the shaft 522 opening at the head end 518 of the rod guide 516. The amount of extension of the tip 514 will, in turn, set the cutting depth (t) of the tip 514 into the ridges 1 or inner surface 104 of the tube. A second screw 528 may be inserted in a screw hole 530 (shown in FIGS. 30-31 at the head end 518 of the rod guide 516) provided along the length of the rod guide 516. This second screw 528 locks the rod 512 (and thus the tip 514 extension) in place relative to the rod guide 516.

The head end 518 of the rod guide 516 is preferably provided with a centering plane 532. In use, the centering plane 532 contacts the tops of the ridges 1 or the inner surface 104 of the tube to be cut by the cutting tip 514. Through such contact, the centering plane 532 keeps the tool assembly 510 centered within the tube during inner surface enhancement.

Figure 32:
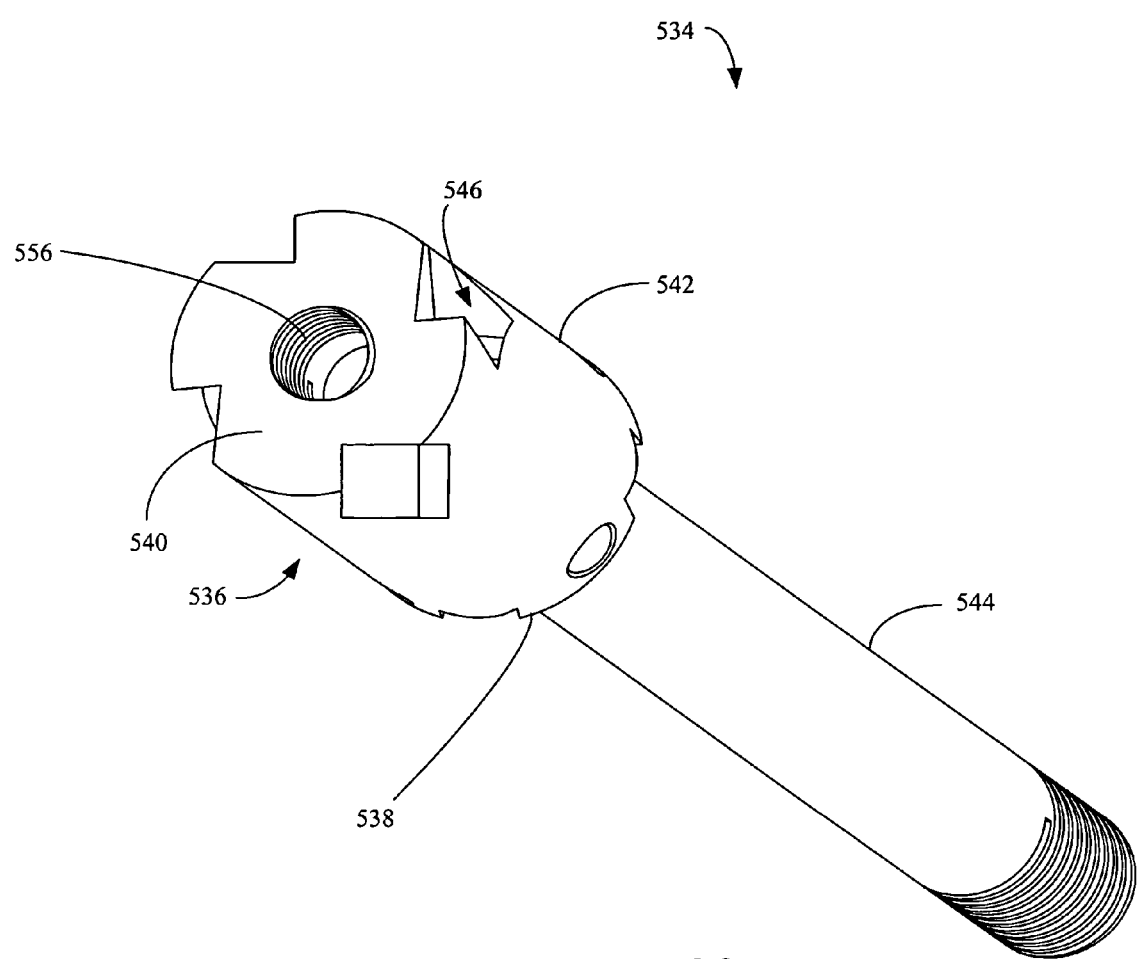
FIG. 32 is a perspective view of the tool holder of the embodiment of FIGS. 25 and 26.
Figure 33:
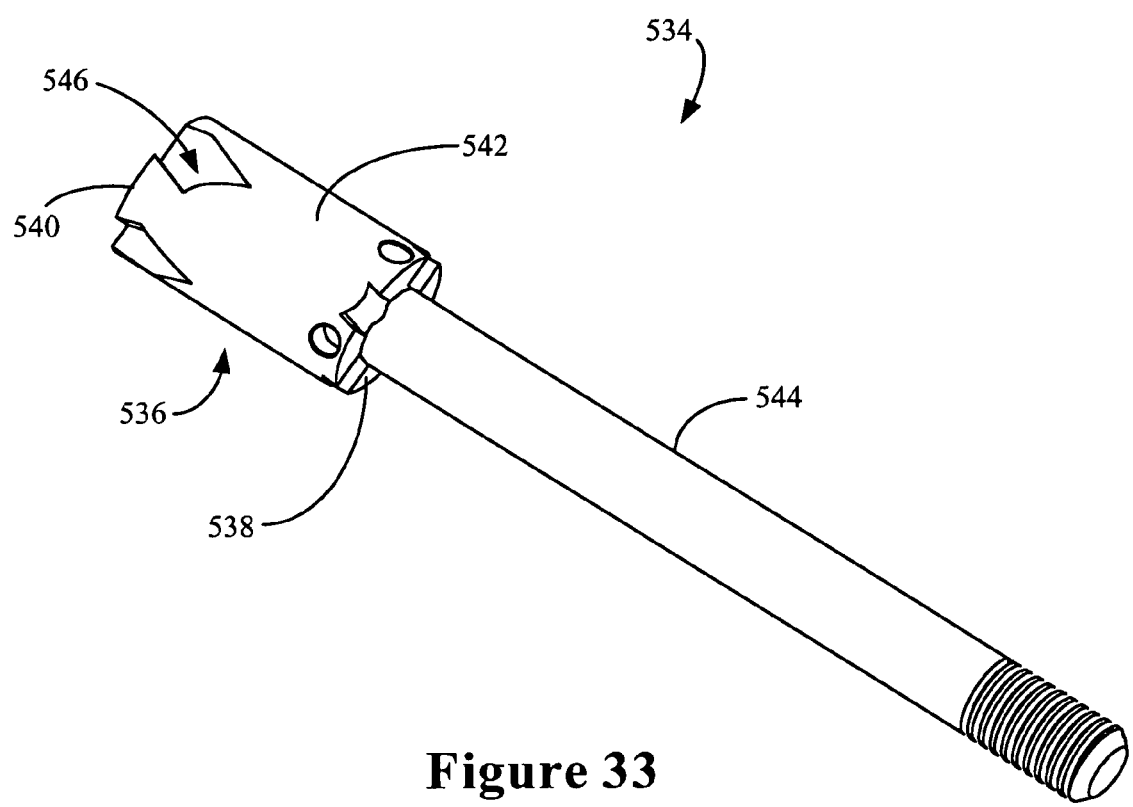
FIG. 33 is an alternative perspective view of the tool holder of FIG. 32.

The rod guide 516 is then inserted into a tool holder 534, best seen in FIGS. 32-33. The tool holder 534 includes a head portion 536 and a rod portion 544 that defines the tool holder longitudinal axis (not shown). The head portion 536 has an outer wall 542 (shown as being cylindrical but that can be of any suitable shape) and is provided with hollow shafts 546 that extend substantially through the length of the head portion 536. Each shaft 546 preferably has an opening at or near the top wall 540 of the head portion 536 and at or near the bottom wall 538 of the head portion 536. The axis of each shaft 546 is positioned at an angle of preferably 0° to 90°, inclusive, with the longitudinal axis of the tool holder 534.

Figure 34:
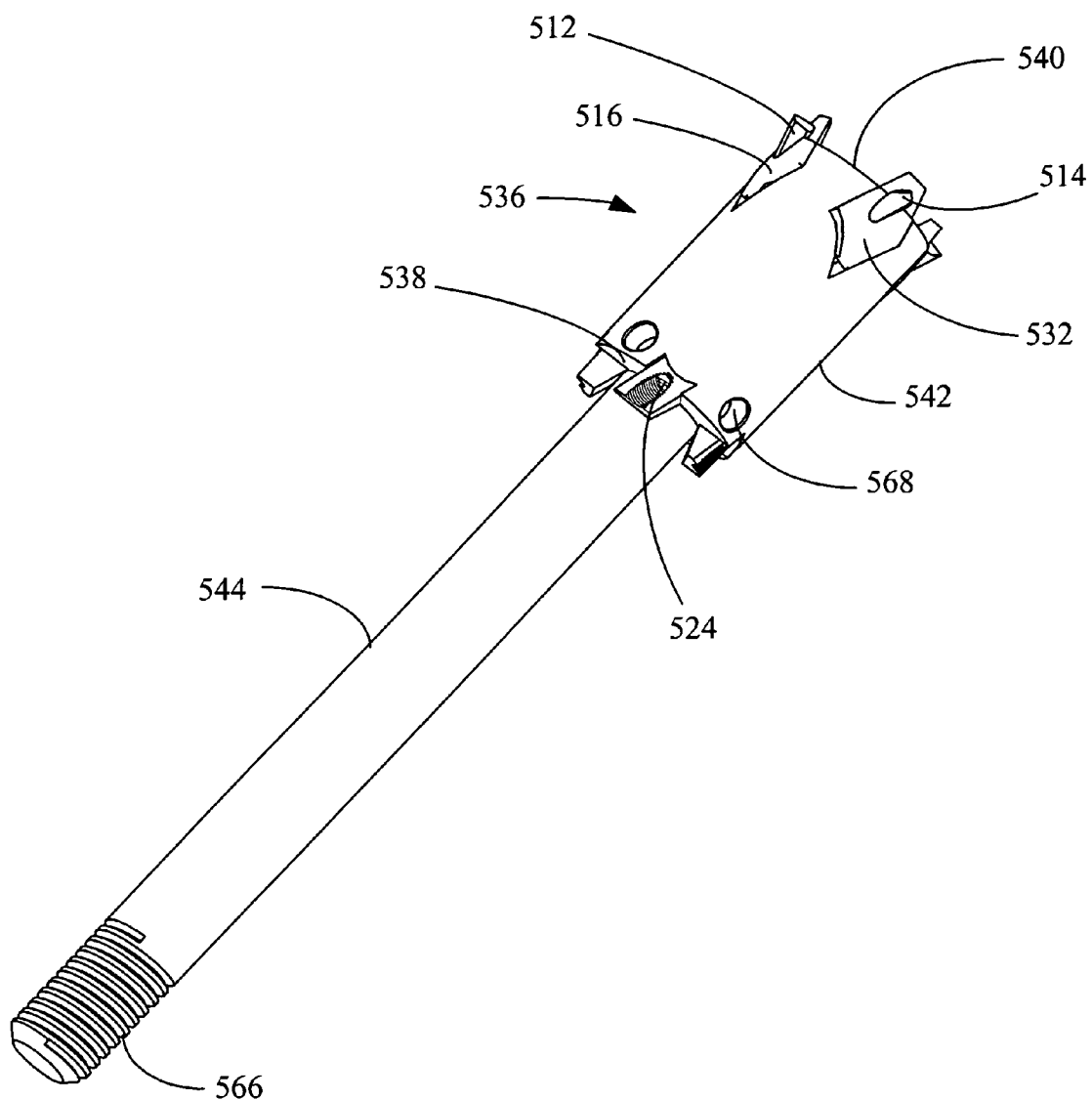
FIG. 34 is a perspective view of the rod/rod guide assembly of FIGS. 30 and 31 positioned in the tool holder of FIGS. 32 and 33.

Shafts 546 are dimensioned to receive a rod guide 516 (with rod 512), which is slid into a shaft 546 on the tool holder 534, as shown in FIG. 34.

The tool holder 534 may be provided with any number of hollow shafts 546 depending on the number of tips 514 desired to be used in a particular application. Depending on the desired pitch ($P_{a,p}$) of the ridge protrusions, not all of the hollow shafts 546 need be occupied with a rod guide 516 and rod 512. Moreover, the geometry of the tips 514 on the rods 512 provided in a tool holder 534 need not be the same. Rather, tips 514 having different geometries to form protrusions having different shapes, orientations, and other geometries may be provided in the tool holder 534. For example, as explained above with respect to FIGS. 18A-C and 22, providing tips 14 having different angles $\phi_1$ will result in protrusions having different angles of inclination ω. In this way, tool assembly 510 may be used to create a boiling surface with inclined protrusions as shown in FIGS. 18A-C.

Moreover, as explained above with respect to FIGS. 23A-B and 24A-D, by providing tips 302 having multiple cutting edges, protrusions with thickened tips 124 may be formed to create nucleate boiling cavities.

Figure 25:
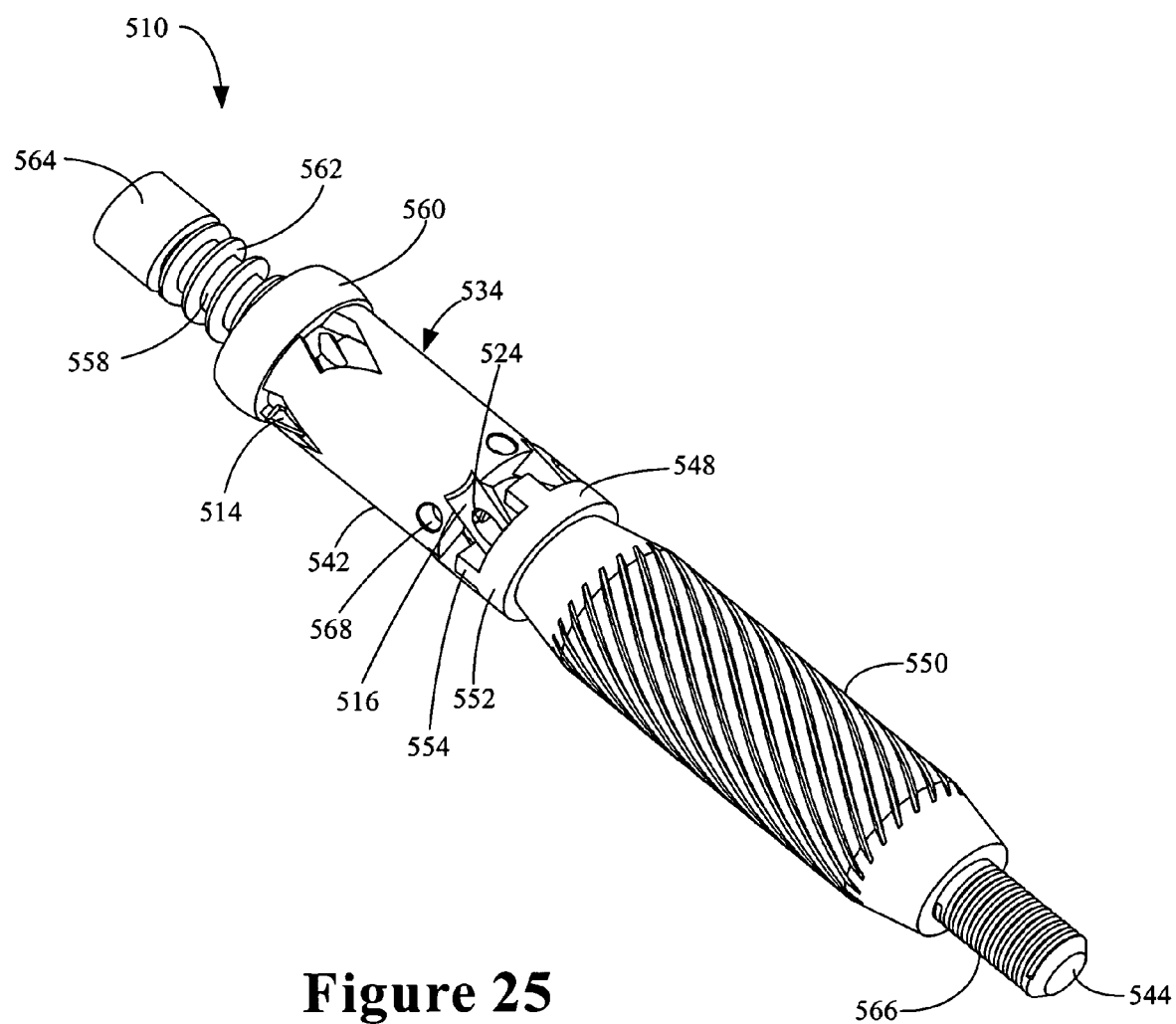
FIG. 25 is a perspective view of an alternative tool embodiment of this invention with recessed tips.
Figure 26:
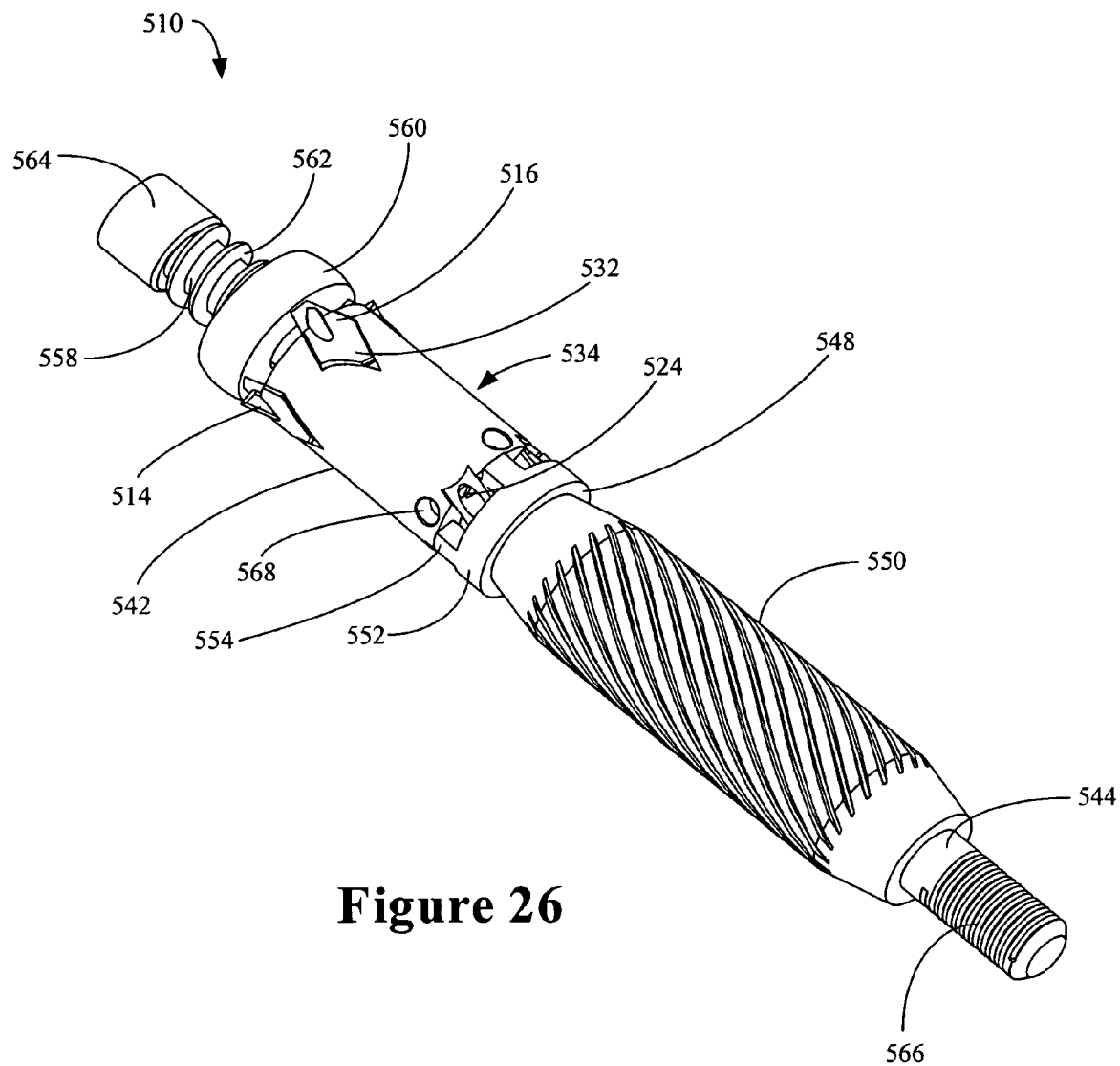
FIG. 26 is a perspective view of a the embodiment of FIG. 25 with exposed tips.
Figure 27:
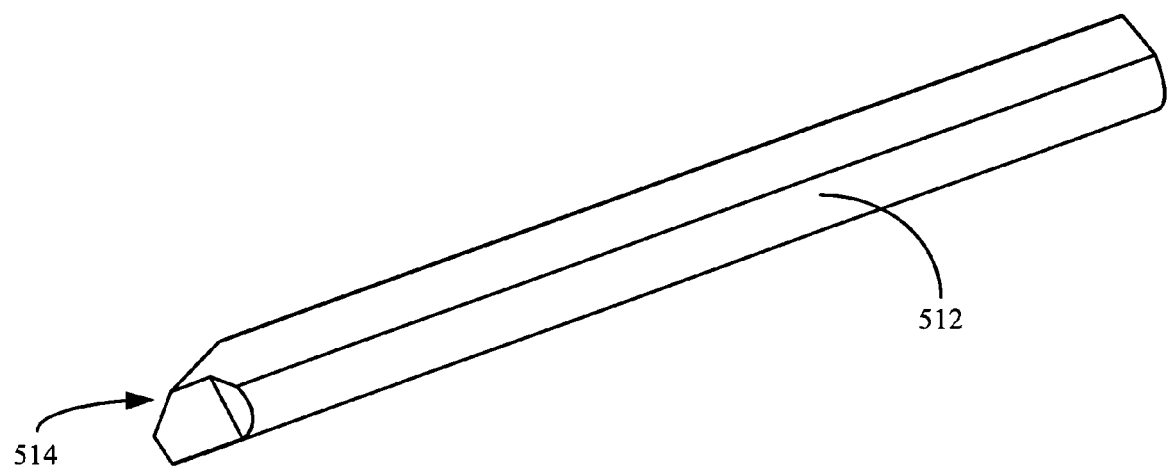
FIG. 27 is a perspective view of a rod of the embodiment of FIGS. 25 and 26.
Figure 28:
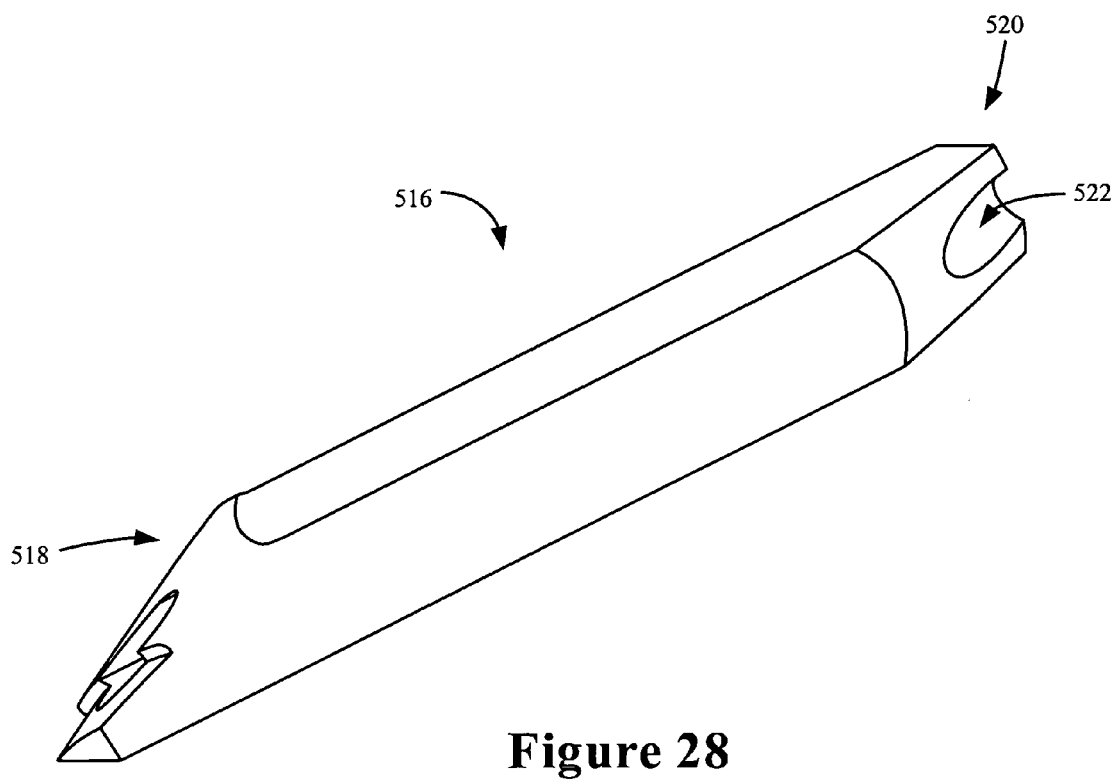
FIG. 28 is a perspective view of a rod guide of the embodiment of FIGS. 25 and 26.
Figure 29:
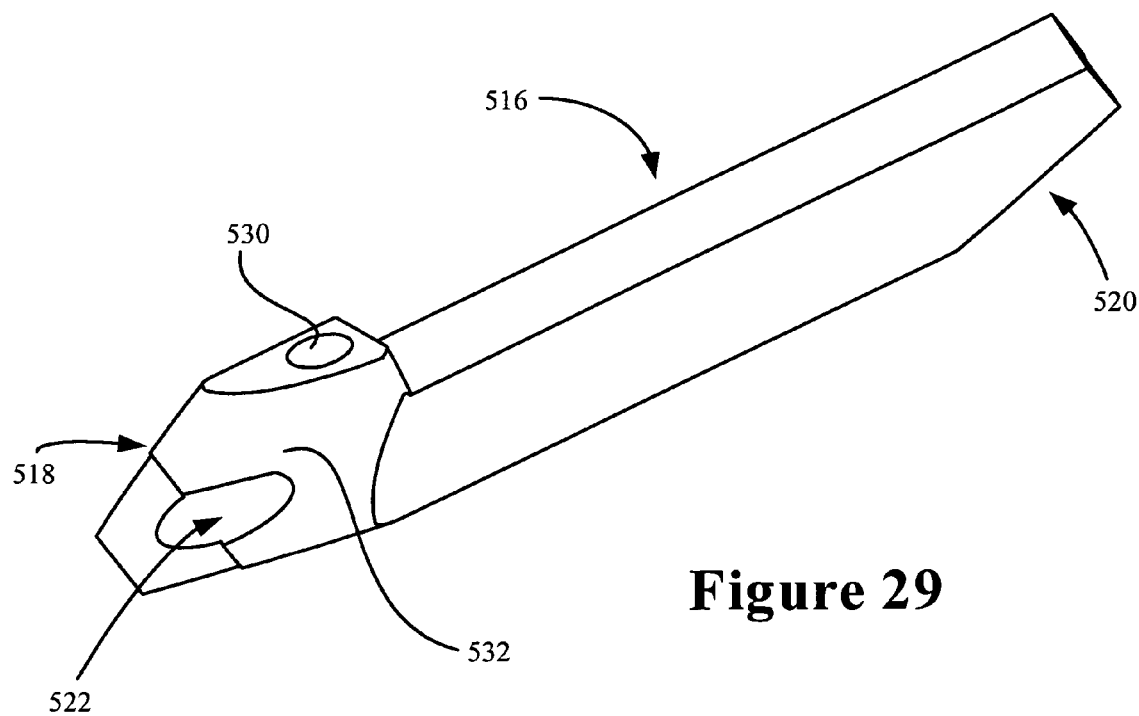
FIG. 29 is an alternative perspective view of the rod guide of FIG. 28.

Referring now to FIGS. 25-26, a washer 548 and a mandrel 550 are threaded onto the rod portion 544 of the tool holder 534. The washer 548 includes a base 552 from which a plurality of prongs 554 extend. The prongs 554 of the washer 548 are positioned facing the bottom wall 538 of the head portion 536 of the tool holder 534. The top wall 540 of the head portion 536 of the tool holder 534 is preferably provided with a threaded hole 556 in which a rod 558 is screwed. A sizing spacer 560 (mounted on the rod 558) is positioned adjacent the head portion 536 of the tool holder 534, and a biasing element (in this case spring 562, also mounted on the rod 558) is positioned adjacent the sizing spacer 560. The biasing element may be any structure (including, but not limited to, a spring, including a flat spring, disc spring, helical spring, coil spring, zigzag spring, etc.) and be made from any material capable of compressing and expanding (including, but not limited to, rubber, metal, plastic, etc.). A nut 564 is screwed on the end of the rod 558 to retain the spring 562 and sizing spacer 560 on the tool assembly 510. Note that a screw having a head and a shaft (not shown) can easily be substituted for the rod 558 and nut 564.

When assembled, the head end 518 of each rod guide 516 contacts the sizing spacer 560 and the tail end 522 of each rod guide 516 contacts the base 552 of the washer 548. The distal end of the rod portion 544 of the tool holder 534 is provided with threads 566 so that the tool assembly 510 can be screwed onto the end of a guide rod (which can be fixed or rotate) that, with the assembly shown in FIGS. 25-26 attached to it, extends through the inside of a tube to enhance the tube surface.

In an equilibrium state (shown in FIG. 25), tips 514 (fixed in rod guides 516) do not extend beyond the outer wall 542 of the head portion 536 of the tool holder 534 and thus are protected. In use, the mandrel 550 forms ridges on the inner surface of a tube, which are in turn cut and lifted by tips 514 to form the desired protrusions. One of skill in the art will understand that the mandrel 550 can be replaced with a grooving tool 200 (shown in FIG. 19) to form grooves 108 (instead of ridges 1) on the tube surface (assuming, of course, that a force is applied to the tool assembly 510 to effectuate exposure of the tips 514 from the tool holder 534). Tips 514 would then cut into tube wall 104 (instead of upstanding ridges 1) to form protrusions, as shown in FIG. 15A.

During this process, the mandrel 550 (or grooving tool 200) bears against the washer 548 which in turn bears against the rod guides 516. Under such pressure, the rod guides 516 slide along their respective hollow shafts 546 of the tool holder 534 toward the sizing spacer 560. In particular, the base 552 of the washer 548 exerts a force on the tail ends 520 of the rod guides 516 and pushes them along shafts 546. In this way, the tips 514 are pushed beyond the outer wall 542 of the head portion 536 of the tool holder 534 (as shown in FIG. 26) and exposed for cutting and lifting of the ridges 1 or inner tube surface 104 to form protrusions, as described above in connection with FIGS. 1a-c and 15a-c. The rod guides 516 bear against the sizing spacer 560 which in turn compresses the spring 562. Contact between the prongs 554 on the washer 548 and the bottom wall 538 of the head portion 536 of the tool holder 534 prevents further movement of the rod guides 516. Thus, the height of the washer prongs 554 controls the amount by which the rod guides 516 (and thus the tips 514) are pushed relative to the tool holder 534 and thus impacts the amount by which the tips 514 are exposed and consequent resulting cutting depth (t) of the tips 514 into the tube surface. Washers 548 having different height prongs 554 may be easily substituted on the tool assembly 510 and used to accurately control how far the tips 514 will extend beyond the outer wall 542 of the head portion 536 of the tool holder 534 and the resulting cutting depth (t) of the tips 514.

After cutting and lifting with tips 514, the newly-formed protrusions contact the sizing spacer 560, which regulates the height of the protrusions cut by tips 514. Protrusions that are too high are flattened by the sizing spacer 560 until they reach the specified height. The height of the protrusions may be easily adjusted by substituting spacers 560 having different diameters on the tool assembly 510. The spacer 560 may also be used to flatten some or all of the resulting protrusions to form nucleate boiling cavities, such as shown in FIGS. 16A-D, 17A-B, and 20B-C. Alternatively, a rod 512 with a tip 514 having the geometry of flattening tip 316 (shown in FIG. 20) may also be inserted into the tool holder. In this way, a rod tip (or tips) positioned in the tool holder may also perform the flattening function.

When protrusion formation is complete and a force is no longer exerted on washer 548, the compressed spring 562 causes the assembly 510 to return to its equilibrium state (shown in FIG. 25), meaning that the spring 562 forces the sizing spacer 560 to push the rod guides 516 back until the sizing spacer 560 contacts the top wall 540 of the head portion 536 of the tool holder 534. In this way, the rod guides 516 slide along shafts 546 to retract the tips 514 back within the outer wall 542 of the tool holder 534.

Given the forces being applied to the different components of the tool assembly 510, the washer 548, tool holder 534, rod guide 516, and sizing spacer 560 should preferably be made from materials capable of retaining their structure when subjected to such forces. For example, these components may be made from metal, including carbide, steel, etc.

To remove the tool assembly 510, it need only be unscrewed from the guide rod (not shown) by unscrewing the distal end of the rod portion 544 of the tool holder 534. However, oftentimes the tool assembly 510 will become firmly fixed on the guide rod and thus unscrewing can be difficult. The force required to unscrew the tool assembly 510, if done by hand, can cause damage to the tool assembly 510. Thus, it is preferable (but not required) to provide holes 568 in the outer wall 542 of the tool holder 534. A device can be inserted into the holes 568, and the tool assembly 510 unscrewed using torque.

The design of this tool assembly 510 results in a number of benefits. If a tip 514 on a rod 512 wears down, the rod 512 can easily be removed for reshaping or the entire rod 512 replaced. The rod 512 containing the worn tip 514 can be removed from the rod guide 516 by removing screw 524 or 528 from the rod guide 516 and sliding the rod 512 from the rod guide 516. Alternatively, the entire rod guide 516 can be removed from the tool holder 534. Either way, tip 514 on an existing rod 512 can be reshaped and returned to the rod guide 516 or a new rod 512 with a new tip 514 can be inserted into the rod guide 516. Another benefit of this tool design is that tips 514 on the rods 512 can be re-shaped multiple times before the rods 512 must be replaced. This significantly reduces tooling and material costs. Moreover, the tool assembly 510 can easily be used on tubes with different wall thicknesses by using washers 548 having different prong 554 heights to adjust how much the tips 514 protrude from the tool holder 534 during use and/or by adjusting how far the tips 514 extend from their respective rod guides 516, as described above.

The foregoing is provided for the purpose of illustrating, explaining and describing embodiments of the present invention. Further modifications and adaptations to these embodiments will be apparent to those skilled in the art and may be made without departing from the spirit of the invention or the scope of the following claims.

We claim:

1. A tool assembly for cutting metal comprising:
   a. a holder comprising a longitudinal axis, an exterior top wall, an exterior bottom wall, an exterior outer wall and at least one substantially hollow shaft, wherein the at least one shaft extends through the holder and comprises a first opening and a second opening;
   b. at least one rod assembly comprising:
      i. a rod guide having a head end and a tail end;
      ii. a rod having a tip shaped with a tip geometry and positioned in the rod guide, wherein the tip extends from the head end of the rod guide,
   wherein the at least one rod assembly is positioned in the at least one shaft of the holder and wherein the head end of the rod guide is capable of extending from the first opening of the at least one shaft and wherein the tail end of the rod guide is capable of extending from the second opening of the at least one shaft;
   c. a washer positioned substantially adjacent the exterior bottom wall of the holder and adapted to apply pressure to the tail end of the rod guide to cause the at least one rod assembly to move a distance along the at least one shaft and the tip to extend beyond the outer wall of the holder when a force is exerted on the washer;
   d. a spacer positioned substantially adjacent the exterior top wall of the holder and adapted to apply pressure to the head end of the rod guide to cause the at least one rod assembly to move along at least a portion of the at least one shaft to retract the tip within the outer wall of the holder; and
   e. a biasing element positioned substantially adjacent the spacer.

2. The tool assembly of claim 1, wherein the at least one shaft extends at an angle between 0°-90°, inclusive, relative to the longitudinal axis of the holder.

3. The tool assembly of claim 1, wherein the position of the rod in the rod guide is adjustable.

4. The tool assembly of claim 1, wherein the rod is removable from the rod guide.

5. The tool assembly of claim 4, wherein the tip of the rod can be reshaped and repositioned in the rod guide.

6. The tool assembly of claim 1, wherein the tip is adapted to form protrusions on an inner surface of a tube by cutting and lifting metal.

7. The tool assembly of claim 6, wherein the tip geometry comprises at least one cutting edge.

8. The tool assembly of claim 7, wherein the tip geometry comprises at least two cutting edges.

9. The tool assembly of claim 6, wherein the tip geometry comprises at least one lifting edge.

10. The tool assembly of claim 1, wherein the at least one rod assembly comprises a plurality of rod assemblies.

11. The tool assembly of claim 10, wherein the tip geometry of the tips of the rods of at least two of the plurality of rod assemblies differs.

12. The tool assembly of claim 1, wherein the at least one rod assembly is removable from the holder.

13. The tool assembly of claim 1, wherein the washer comprises a base and at least one prong having a height and extending from the base, wherein the base is adapted to apply pressure to the tail end of the rod guide and wherein the height of the at least one prong at least partially controls the distance the rod assembly moves along the at least one shaft.

14. The tool assembly of claim 1, wherein the biasing element is adapted to expand when the force relaxes to exert an expansion force on the spacer.

15. The tool assembly of claim 1, the biasing element comprises a spring.

16. A tube having an inner surface enhanced by the tool assembly of claim 1.

17. The tube of claim 16, wherein the tube comprises protrusions.

18. The tube of claim 17, wherein the protrusions are flattened, bent, or inclined relative to each other to form nucleate boiling cavities.

19. A method of enhancing the inner surface of a tube comprising:
   a. providing a tool assembly comprising:
      (i) a holder comprising a longitudinal axis, an exterior top wall, an exterior bottom wall, an exterior outer wall and at least one substantially hollow shaft, wherein the at least one shaft extends through the holder and comprises a first opening and a second opening;
      (ii) at least one rod assembly comprising:
         a rod guide having a head end and a tail end;
         a rod having a tip shaped with a tip geometry and positioned in the rod guide, wherein the tip extends from the head end of the rod guide,
      wherein the at least one rod assembly is positioned in the at least one shaft of the holder and wherein the head end of the rod guide is capable of extending from the first opening of the at least one shaft and wherein the tail end of the rod guide is capable of extending from the second opening of the at least one shaft;
      (iii) a washer positioned substantially adjacent the exterior bottom wall of the holder and adapted to apply pressure to the tail end of the rod guide to cause the at least one rod assembly to move a distance along the at least one shaft and the tip to extend beyond the outer wall of the holder when a force is exerted on the washer;
      (iv) a spacer positioned substantially adjacent the exterior top wall of the holder and adapted to apply pressure to the head end of the rod guide to cause the at least one rod assembly to move along at least a portion of the at least one shaft to retract the tip within the outer wall of the holder; and
      (v) a biasing element positioned substantially adjacent the spacer;

b. positioning the tool assembly in the tube;

c. causing relative rotation and relative axial movement between the tube and the tool assembly; and d. forming protrusions on the inner surface of the tube with the tip.

20. The method of claim 19, further comprising exerting a force on the washer, wherein the force causes the washer to apply pressure to the tail end of the rod guide to cause the at least one rod assembly to move a distance along the at least one shaft and the tip to extend beyond the outer wall of the holder.

21. The method of claim 19, further comprising flattening the protrusions, bending the protrusions, or inclining adjacent protrusions relative to each other to form nucleate boiling cavities.

22. The method of claim 19, further comprising removing the rod from the tool holder, reshaping the tip of the rod, and repositioning the rod in the tool holder.

* * * * *